(12) United States Patent
Chen

(10) Patent No.: US 9,935,930 B2
(45) Date of Patent: *Apr. 3, 2018

(54) PRIVATE AND SECURE COMMUNICATION ARCHITECTURE WITHOUT UTILIZING A PUBLIC CLOUD BASED ROUTING SERVER

(71) Applicant: Kingston Digital, Inc., Fountain Valley, CA (US)

(72) Inventor: Ben Wei Chen, Fountain Valley, CA (US)

(73) Assignee: Kingston Digital, Inc., Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/663,244

(22) Filed: Mar. 19, 2015

(65) Prior Publication Data

US 2015/0195270 A1 Jul. 9, 2015

Related U.S. Application Data

(63) Continuation-in-part of application No. 14/526,393, filed on Oct. 28, 2014, which is a continuation-in-part
(Continued)

(51) Int. Cl.
G06F 7/04 (2006.01)
G06F 15/16 (2006.01)
(Continued)

(52) U.S. Cl.
CPC .......... H04L 63/08 (2013.01); H04L 61/2514 (2013.01); H04L 61/2567 (2013.01);
(Continued)

(58) Field of Classification Search
CPC ......... H04L 29/08306; H04L 29/06319; H04L 29/06326; H04L 29/06333;
(Continued)

(56) References Cited

U.S. PATENT DOCUMENTS

| | | |
|---|---|---|
| 5,408,618 A | 4/1995 | Aho et al. |
| 6,438,594 B1 | 8/2002 | Bowman-Amuah |

(Continued)

FOREIGN PATENT DOCUMENTS

| | | |
|---|---|---|
| GB | 2341523 | 3/2000 |
| WO | WO2011133908 | 10/2011 |

OTHER PUBLICATIONS

Craig Ellison, "Iomega Home Media Network Hard Drive—Cloud Edition Reviewed", Applicant's admitted prior art of U.S. Appl. No. 13/229,285.*

(Continued)

*Primary Examiner* — Catherine Thiaw
*Assistant Examiner* — Quy Pham
(74) *Attorney, Agent, or Firm* — Brundidge & Stranger, P.C.

(57) ABSTRACT

A method for use with a public cloud network is disclosed. The method includes setting up a private cloud routing server and a smart device client in a client server relationship. The private cloud routing server includes a first message box. The smart client includes a second message box. The first and second message boxes are located on the public cloud network. The method also includes passing an authenticated session based message between the first and the second message boxes in a secure manner. The smart device client and the private cloud routing server can communicate with each other after authentication to provide security. The method also includes setting up another smart device client in a client server relationship with the private cloud routing server. The two smart device clients can privately and securely communicate with each other through the public cloud network.

21 Claims, 15 Drawing Sheets

Related U.S. Application Data of application No. 14/450,104, filed on Aug. 1, 2014, which is a continuation-in-part of application No. 13/229,285, filed on Sep. 9, 2011, now Pat. No. 9,203,807.

(51) Int. Cl.

| | | |
|---|---|---|
| *G06F 17/30* | (2006.01) | |
| *H04L 29/06* | (2006.01) | |
| *H04L 29/08* | (2006.01) | |
| *H04L 29/12* | (2006.01) | |
| *H04W 12/02* | (2009.01) | |

(52) U.S. Cl.
CPC ........ *H04L 61/2589* (2013.01); *H04L 63/029* (2013.01); *H04L 63/0272* (2013.01); *H04L 63/0428* (2013.01); *H04L 63/101* (2013.01); *H04L 63/104* (2013.01); *H04L 67/10* (2013.01); *H04L 67/1004* (2013.01); *H04W 12/02* (2013.01)

(58) Field of Classification Search
CPC ......... H04L 29/08144; H04L 29/12009; G06F 17/30206; G06F 17/30209
See application file for complete search history.

(56) References Cited

U.S. PATENT DOCUMENTS

| | | | |
|---|---|---|---|
| 6,563,515 | B1 | 5/2003 | Reynolds et al. |
| 6,779,004 | B1 | 8/2004 | Zintel |
| 6,954,790 | B2 | 10/2005 | Forslow |
| 6,978,314 | B2 | 12/2005 | Tarr |
| 6,981,041 | B2 | 12/2005 | Araujo et al. |
| 7,068,680 | B1 | 6/2006 | Kaltenmark et al. |
| 7,120,429 | B2 | 10/2006 | Minear et al. |
| 7,219,140 | B2 | 5/2007 | Marl et al. |
| 7,293,077 | B1 | 11/2007 | Teo et al. |
| 7,328,256 | B2 | 2/2008 | Taoyama et al. |
| 7,392,034 | B2 | 6/2008 | Westman et al. |
| 7,408,882 | B2 | 8/2008 | Abdo et al. |
| 7,467,198 | B2 | 12/2008 | Goodman et al. |
| 7,487,230 | B2 | 2/2009 | Gu et al. |
| 7,558,846 | B2 | 7/2009 | Gu et al. |
| 7,562,393 | B2 | 7/2009 | Buddhikot et al. |
| 7,602,756 | B2 | 10/2009 | Gu et al. |
| 7,627,653 | B2 | 12/2009 | Taoyama et al. |
| 7,630,341 | B2 | 12/2009 | Buddhikot et al. |
| 7,636,764 | B1* | 12/2009 | Fein et al. .................... 709/212 |
| 7,640,340 | B1 | 12/2009 | Stapp et al. |
| 7,640,546 | B2 | 12/2009 | Zarenin et al. |
| 7,647,203 | B1 | 1/2010 | Herz |
| 7,676,690 | B2 | 3/2010 | Bucher |
| 7,788,656 | B2 | 8/2010 | Harper |
| 7,810,148 | B2 | 10/2010 | Bed-Shacher et al. |
| 7,978,714 | B2 | 7/2011 | Rao et al. |
| 8,045,000 | B2 | 10/2011 | Davidson et al. |
| 8,069,217 | B2 | 11/2011 | Lo et al. |
| 8,170,209 | B2 | 5/2012 | Peng et al. |
| 8,300,056 | B2 | 10/2012 | Nugent |
| 8,412,798 | B1 | 4/2013 | Wang |
| 2004/0223469 | A1 | 11/2004 | Bahl et al. |
| 2005/0286476 | A1 | 12/2005 | Crosswy et al. |
| 2006/0271968 | A1 | 11/2006 | Zellner |
| 2006/0291434 | A1 | 12/2006 | Gu et al. |
| 2007/0165579 | A1 | 7/2007 | Delibie et al. |
| 2007/0294368 | A1 | 12/2007 | Bomgaars et al. |
| 2008/0016491 | A1 | 1/2008 | Doepke |
| 2008/0019333 | A1 | 1/2008 | Kharia et al. |
| 2008/0162698 | A1 | 7/2008 | Hopen et al. |
| 2008/0201751 | A1 | 8/2008 | Ahmed et al. |
| 2008/0301794 | A1 | 12/2008 | Lee |
| 2009/0019492 | A1 | 1/2009 | Grasset |
| 2009/0106394 | A1 | 4/2009 | Lin et al. |
| 2009/0129301 | A1 | 5/2009 | Belimpasakis |
| 2009/0303973 | A1 | 12/2009 | Patil |
| 2010/0036955 | A1 | 2/2010 | Hopen et al. |
| 2010/0188987 | A1 | 7/2010 | Azimi et al. |
| 2010/0251335 | A1* | 9/2010 | Srisuresh ................ G06F 15/16 726/3 |
| 2011/0107379 | A1 | 5/2011 | Lejoie et al. |
| 2011/0145418 | A1 | 6/2011 | Pratt et al. |
| 2011/0145821 | A1 | 6/2011 | Philipson et al. |
| 2012/0030584 | A1 | 2/2012 | Brian |
| 2012/0042102 | A1 | 2/2012 | Chung et al. |
| 2012/0042275 | A1 | 2/2012 | Neerudu et al. |
| 2012/0081382 | A1 | 4/2012 | Lindahl et al. |
| 2012/0084798 | A1 | 4/2012 | Reeves et al. |
| 2012/0236796 | A1* | 9/2012 | Lazaridis et al. ............. 370/328 |
| 2012/0307141 | A1 | 12/2012 | Millet et al. |
| 2012/0311329 | A1* | 12/2012 | Medina ................ H04L 12/581 713/168 |
| 2013/0024545 | A1 | 1/2013 | Sheppard et al. |
| 2013/0067550 | A1 | 3/2013 | Chen et al. |
| 2013/0177891 | A1 | 7/2013 | Hammerschmidt |
| 2013/0231146 | A1 | 9/2013 | Mathias et al. |
| 2014/0141721 | A1 | 5/2014 | Kim et al. |
| 2014/0306865 | A1 | 10/2014 | Pan et al. |
| 2014/0359477 | A1 | 12/2014 | Chen |
| 2015/0327313 | A1 | 11/2015 | Kim et al. |

OTHER PUBLICATIONS

Guy McDowell, "How Does a Router Work", Oct. 2009, http://www.makeuseof.com/tag/technology-explained-how-does-a-router-work/.*

Use Yahoo Messenger for a Video or Audio Conference, Mar. 2005, http://education.ucf.edu/techfac/docs/videochattutorial.pdf.*

Malik, Om (May 22, 2009) "How Pogoplug Works" gigaom.com http://gigaom.com/2009/05/22/how-pogoplug-works/.

Mldonkey (Oct. 5, 2010) "WhatFirewallPortsToOpen" mldonkey.sourceforge.net. http://mldonkey.sourceforge.net./WhatFirewallPortsToOpen.

Rue Liu, "Iomega Home Media Hard Drive Cloud Edition Review—SlashGear", Jun. 2011, SlashGear, http://www.slashgear.com/iomega-home-media-hard-drive-cloud-edition-review-14156840/.

Filename "2012 Sep WiFi-Miracast brochure.pdf" Miracast-paper: "Wi-Fi Certified MiracastTM: Extending the Wi-Fi experience to seamless video display" published by Wi-Fi Alliance on Sep. 19, 2012.

Filename: "WiFi Miracast Demo video—Screenshots and Transcript.pdf" Screenshots and Transcripts of "Wi-Fi Certified MiracastTM Demo at 2013 CES" video https://www.youtube.com/watch?v=cYagdOp9y7E published by Wi-Fi Alliance on Jan. 9, 2013.

Filename: "Jul. 2011—Samsung Remote App.pdf Samsung App Profile: Remote App" published published online on Jul. 30, 2011.

Filename: "Mar. 2013—panasonic-my-home-screen-smart-tv.pdf" "Panasonic My Home Screen Smart TV Interface" published online on Mar. 6, 2013.

Filename: "Jul. 2012—samsung-tv-remote-app" "Samsung TV Remote app not working for some 2012" online article published on Jul. 18, 2012.

\* cited by examiner

PRIVATE AND SECURE COMMUNICATION ARCHITECTURE WITHOUT UTILIZING A PUBLIC CLOUD BASED ROUTING SERVER

CROSS-REFERENCE TO RELATED APPLICATION

This application is a continuation-in-part of U.S. patent application Ser. No. 14/526,393, filed Oct. 28, 2014, entitled "PRIVATE AND SECURE COMMUNICATION ARCHITECTURE WITHOUT UTILIZING A PUBLIC CLOUD BASED ROUTING SERVER", which a continuation-in-part of U.S. patent application Ser. No. 14/450,104, filed Aug. 1, 2014, entitled "PRIVATE CLOUD ROUTING SERVER, PRIVATE NETWORK SERVICE AND SMART DEVICE CLIENT ARCHITECTURE WITHOUT UTILIZING A PUBLIC CLOUD BASED ROUTING SERVER," which is a continuation-in-part of U.S. patent application Ser. No. 13/229,285, filed Sep. 9, 2011, entitled "PRIVATE CLOUD SERVER AND CLIENT ARCHITECTURE WITHOUT UTILIZING A ROUTING SERVER," all of which are incorporated herein by reference in their entireties.

FIELD OF THE INVENTION

The present invention relates generally to networking and more particularly to the use of private cloud networks.

BACKGROUND OF THE INVENTION

In the Internet connected environment, the Smart Device Clients including smart phone, tablet, eBook reader, notebook, PC and various smart gadgets are ubiquitous and omnipresent. Other than connectivity, one of the values of the Smart Device Clients is to be able to connect at any time and any place to retrieve services from one or many serving parties or servers. The services include audio, video contents, live or archived information, and execution of applications, social media, messaging, email, storage, backup, calendar, contact, synchronization, sharing, remote desktop, Internet of Things (IoT) and others. Other services include realtime private and secure video, audio, text and application communication between at least two Smart Device Clients, are the main subject of this invention. There are different types of servers that serve these various requests from the Smart Device Clients. In general, these types of servers can be categorized to fall into two groups: a public cloud and a private cloud. Servers in the public cloud, implied by the name "public", provide services that tend to be free with limited functionality or fee-based with more sophisticated services and interact with the public. Examples of the public cloud server include data center, social media services and storage/content provider through the Internet. On the other hand, servers in the private cloud tend to address the private need. The services provided are more private and personal as opposed to those offered by the public cloud.

One example of the application of the private cloud server is a private cloud storage server (PCSS). The PCSS sits within the local area network (LAN) managed by the user. It provides on-line and backup storage for the user either within the LAN or in the wide area network (WAN). The user is able to use a Smart Device Client to access information within the private cloud storage server at anytime from anywhere. The private cloud storage server and the associated Smart Device Client therefore form an example of the Private Cloud Server and Client architecture.

Conventionally, there are many storage server solutions, including network attached storage (NAS), Windows/Mac/Linux server, and direct attached storage (DAS) to fulfill the PCSS requirement. But the challenge for the Smart Device Clients in the field has been how to avoid the cumbersome setup to penetrate the firewall behind the router on the LAN to access the PCSS in a home or office environment. There are at least four kinds of solutions to this challenge.

One solution is to assign a fixed IP address and open certain ports for the router in front of the PCSS, such that the Smart Device Client is able to locate the PCSS from outside the LAN and to authenticate itself, penetrate the firewall and establish a secure communication channel with the PCSS.

A second solution applies when a fixed IP address is not available. The user configures the LAN router of the PCSS and opens certain ports to map to the PCSS. The router is therefore able to be located by the intended Smart Device Client through a dynamic DNS (DDNS) service on the WAN. The Smart Device Client can authenticate itself, penetrate the firewall and establish a secure communication channel with the PCSS.

A third solution is to rely on another routing server in the WAN to conduct the virtual private network (VPN) communication between the Smart Device Client and the PCSS. The VPN communication allows the Smart Device Client to locate the PCSS, authenticate itself, penetrate the firewall and establish a secure communication channel with the PCSS.

A fourth solution is to rely on another routing server in the WAN to conduct the remote desktop protocol (RDP) or virtual network computing (VNC) communication between the Smart Device Client and the PCSS. The RDP/VNC communication allows the Smart Device Client to locate the PCSS, authenticate itself, penetrate the firewall and establish a secure communication channel with the PCSS. Other solutions can be mix-and match of the above mentioned solutions.

In a first scenario, a fixed IP address is required and the router needs to be set up and configured. The down side is that a fixed IP involves more cost and is usually not available in the home and small business environment. The router set up and configuration can be very complicated and are not user friendly with most consumers.

In a second scenario, a DDNS service is required and the router needs yet more complex set up. Again, the DDNS set up involves additional cost and complexity into the system. The router set up and configuration can be very complicated and is not user friendly with most consumers.

In a third and fourth scenarios, an outside routing server or service needs to be established, while a router set up is not necessary. The outside routing server or service controls and handles login/authentication between the Smart Device Client and the server. The private cloud becomes less private and less secure through the public cloud based server or service. If for any reason the server or service is down, the communication and availability of the private cloud storage server will be jeopardized.

All of these scenarios require technical expertise that may be suitable for conventional corporate environment, but these scenarios are not suitable for consumer oriented Smart Device Client centric deployment.

In most conventional systems, an outside or public cloud based routing server is used by the Smart Device Client during access to a Private Cloud Service. Using an outside server creates a number of concerns to the Smart Device Client owner.

First, the sense of trust is always in question, because the outside or public cloud based routing server is a middleman during all communication transactions between the Smart Device Client and the Private Cloud Service. It may hold all user account info, password and their corresponding IP addresses of the Smart Device Client and the Private Cloud Service. The routing server is able to sniff any communication in-between and render it insecure.

Second, being an outside and public cloud based routing server, the business model of the owner of server may not always be in-line or in-sync with the Smart Device Client owner. If the routing server is out of service due to any business reason, there is no remedy or option of replacement to restore the service. The routing server potentially poses a tremendous business risk to the user as the vital link in the communication can be broken without recourse.

Conventionally, in the case of communication between two Smart Device Clients, both parties need to sign in to a public cloud based server in order to conduct realtime video, audio, text or application communication. The privacy and security are easily compromised due to the fact that the communication has to go through a public cloud based server, as outlined above.

Accordingly, what is needed is a system and method that addresses the above identified issues. The present invention addresses such a need.

SUMMARY OF THE INVENTION

A method for use with a public cloud network is disclosed. The method includes setting up at least one private cloud routing server and at least one smart device client in a client server relationship. The at least one private cloud routing server includes a first message box associated therewith. The first message box being located on a public cloud network. The at least one smart client includes a second message box associated therewith. The second message box being located on the public cloud network. The method also includes passing session based message between the first message box and the second message box in a secure manner. The session based message is authenticated by the private cloud routing server and the at least one smart device client. The smart device client and the private cloud routing server can communicate with each other after the session based message is authenticated. At least one private network service is then securely accessible by the smart device client through the public cloud network based upon the authenticated session based message. The method also includes setting up the at least another smart device client in a client server relationship with the at least one private cloud routing server. The at least two smart device clients and the private cloud routing server can communicate with each other after the session based message is authenticated. The at least two smart device clients can privately and securely communicate with each other through the public cloud network.

DETAILED DESCRIPTION

Figure 1A:
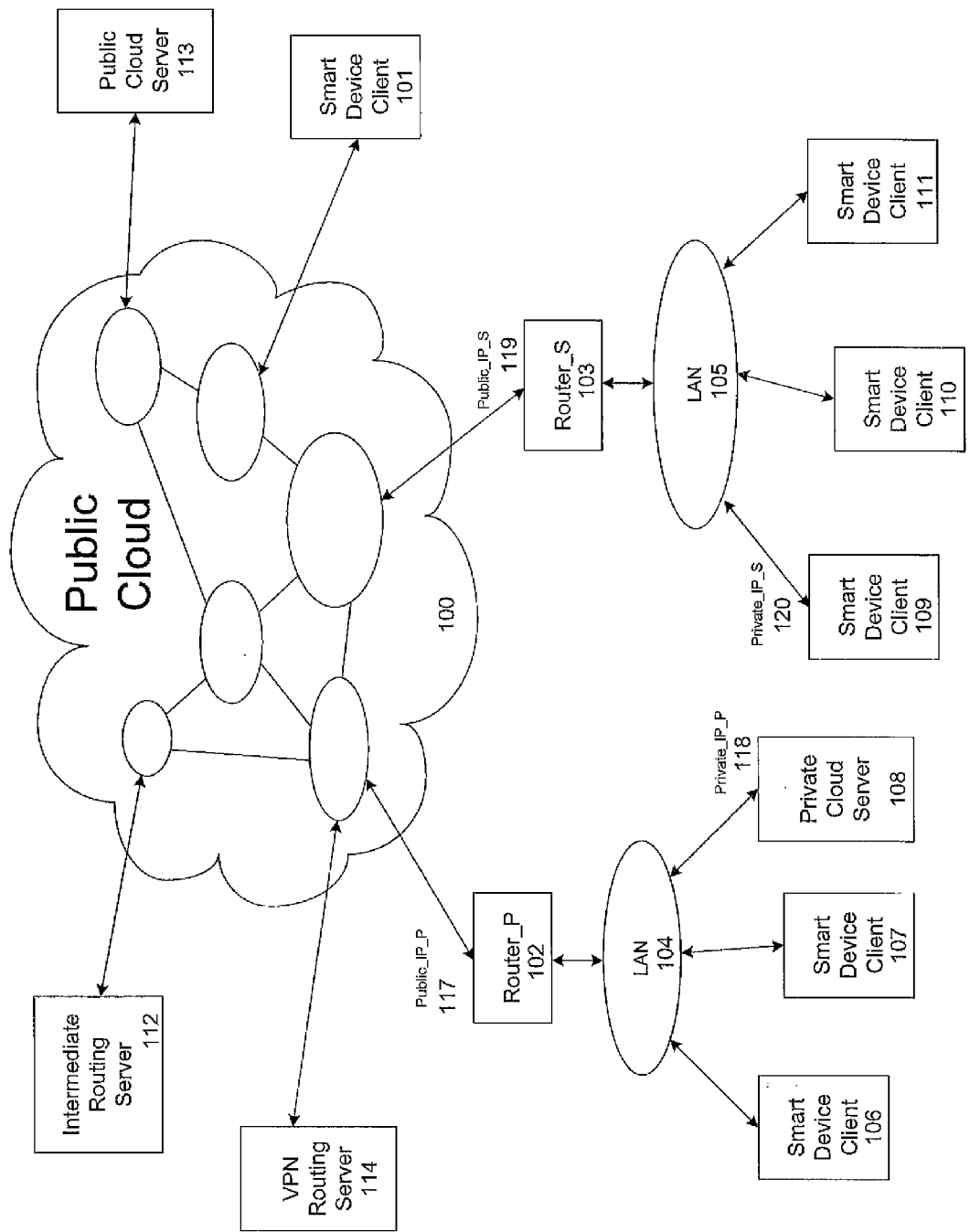
FIG. 1A is a block diagram of a conventional Cloud Network Infrastructure.

The present invention relates generally to networking and more particularly to the use of private cloud networks. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The term "Client" is interchangeable with "Smart Device Client" throughout discussion in the context. The term "router" is in general interchangeable with "gateway", "access point" and/or "NAT" (network address translation) in the discussion.

A system and method in accordance with the present invention addresses the following challenges in a consumer oriented environment for a Smart Device Client in a WAN to be able to obtain services from a Private Cloud Storage Server (PCSS) or any Private Cloud Server (PCS):

1. Access the Private Cloud Server (PCS) at anytime from anywhere.
2. Access the PCS behind the firewall with fixed or dynamic IP address.
3. Require no outside or public cloud based routing server in the WAN.
4. Require no additional router setup in the LAN.
5. Authenticate with the PCS.

6. Establish a secure communication channel with the PCS.

If such challenges can be met and resolved, the deployment of the Private Cloud Server or service will increase exponentially, due to plug and play simplicity and availability. The technical and business concern will also be removed by not utilizing a public cloud based routing server. The Private Cloud Server being utilized for storage, remote desktop service and Internet of Things (IoT) becomes very affordable and ubiquitous in the private cloud infrastructure.

In the private cloud environment, if there are more than one private cloud servers or services co-exist at the same time, it is advantageous to separate out the functions of Private Cloud Server into two functional blocks including Private Cloud Routing Service and Private Network Service. The Private Network Service (PNS) is designed to be managed and accessed on the private network environment, be it wired or wireless, by the Smart Device Client. Examples of a PNS include application program server to provide remote desktop protocol (RDP), VNC, office tools, media player, and other user specific applications. The PNS may also function as a storage server that contains multiple terabytes of storage serving the private cloud. Functions of the Private Cloud Routing Service of the multiple Private Cloud Routing Servers can then be aggregated together into just one Private Cloud Routing Server (PCRS). The Private Cloud Routing Server can generally be referred to as a Private Cloud Router.

A system and method in accordance with the present invention addresses the following challenges in the consumer oriented environment for utilizing the Smart Device Client in the WAN to be able to manage and access Private Network Service (PNS) from a Private Cloud Routing Server (PCRS):

1. Access the Private Cloud Routing Server (PCRS) at anytime from anywhere.
2. Access the PCRS behind the firewall with fixed or dynamic IP address.
3. Require no outside or public cloud based routing server in the WAN.
4. Require no additional router setup in the LAN.
5. Authenticate with the Private Cloud Routing Server (PCRS).
6. Establish a secure communication channel with the Private Network Service (PNS) to manage and access.

If the Private Cloud Routing Server (PCRS) can fulfill the above mentioned challenges, the heterogeneous Private Cloud Servers from different manufacturers and vendors can then be broken down into simpler Private Network Services and remove the complexity of private cloud setup, configuration and access The purpose of a system and method in accordance with the invention is to provide a Private Cloud Routing Server (PCRS), Private Network Service and Client architecture without utilizing a routing server. The system and method in accordance with the present invention addresses the above identified challenges that to allow a Client to be able to access the Private Network Service (PNS) from anywhere at anytime. The system and method also accesses the PNS behind a firewall with fixed or dynamic IP, requires no additional router setup and no public cloud based routing server in the WAN, to authenticate with the PCRS, and to establish a secure communication channel directly with the PNS.

As shown in FIG. 1A, a cloud network infrastructure includes a public cloud 100, a public cloud server 113, an intermediate routing server 112, a VPN routing server 114, a Smart Device Client 101 in the WAN, a Router_P 102 and a Router_S 103. The Router_S 103 connects between a LAN 105 and the Internet in public cloud 100. The Router_P 102 connects between a LAN 104 and the Internet in public cloud 100. Behind the LAN 104, there are Smart Device Clients 106, 107 and a Private Cloud Server (PCS) 108. Behind the LAN 105, there are Smart Device Clients 109, 110 and 111. The Smart Device Client can be a PC, notebook, tablet, eBook reader, GPS, smart TV, set top box, MP3 player, or any networkable embedded device.

They are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Physically, there are three scenarios that a Smart Device Client 101, 107 or 109 can connect to the Private Cloud Server 108. First, a Smart Device Client 107 determines whether the target is in the locally accessible LAN 104 and decides to connect to the Private Cloud Server 108 directly. Second, the Smart Device Client 101 determines the target is not in the locally accessible LAN 104 and decides to connect through the WAN to the public cloud 100. The WAN locates the Router_P 102 and LAN 104, and then connects to the Private Cloud Server 108. Third, the Smart Device Client 109 determines the target is not in the locally accessible LAN 105 and decides to passes through LAN 105, Router_S 103, and connects to the public cloud 100 in the WAN.

The Smart Device Client 109 then locates Router_P 102, LAN 104 and connects to the Private Cloud Server 108. The first and the second scenario are two special cases and derivatives of the third scenario. Therefore, it is beneficial to focus on the third scenario that is broader in scope and complexity.

Figure 2:
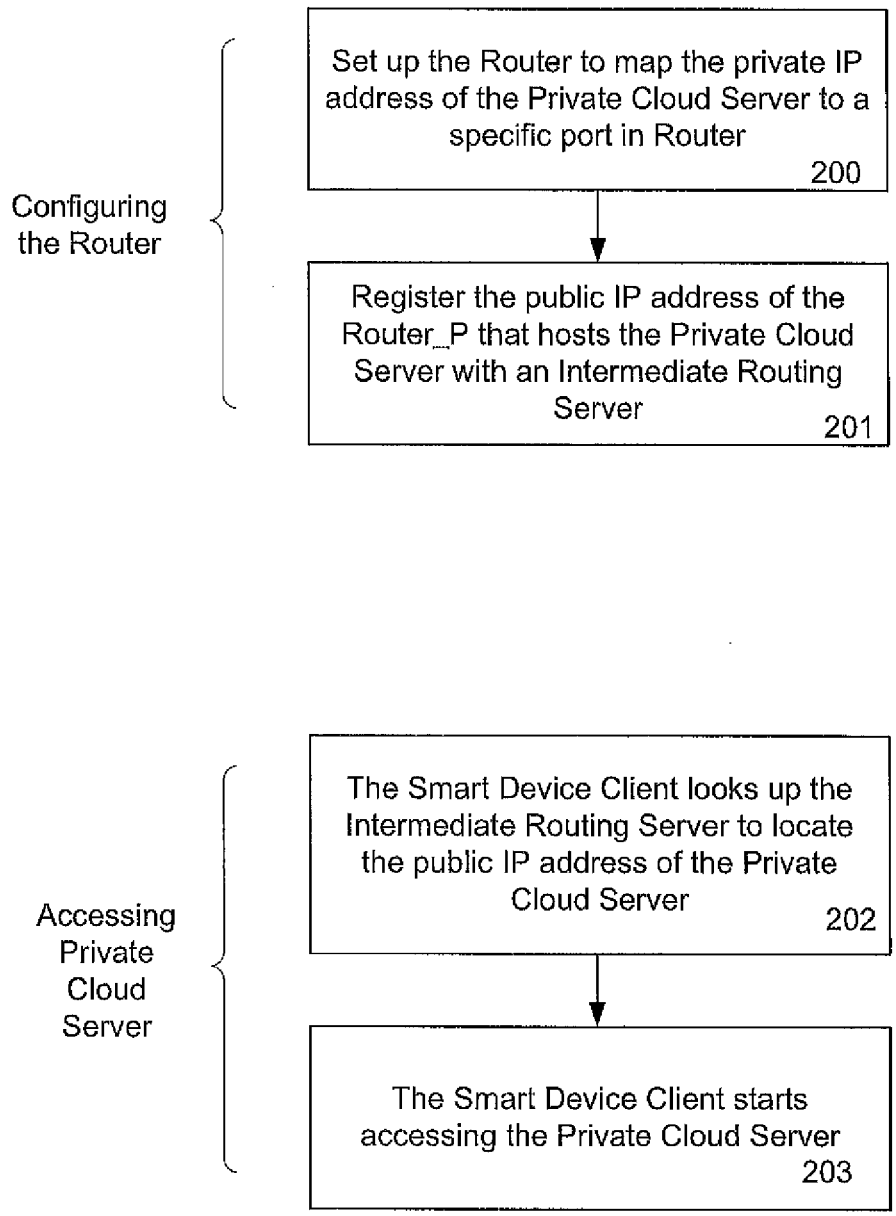
FIG. 2 shows a conventional implementation of how the Private Cloud Server can be accessed physically through the configuration of its Router_P on the LAN.

FIG. 2 shows a conventional implementation of how the Private Cloud Server 108 can be accessed physically through the configuration of its Router_P 102 on the LAN 104. There are two steps involved in configuring the Router_P 102. First, the user needs to map the private IP address of the Private Cloud Server 108, to a specific port in Router_P 102, as in step 200. Second, the user needs to register the public IP address of the Router_P 102 that hosts the Private Cloud Server 108, with an Intermediate Routing Server 112 in the WAN, as in step 201. Before the Smart Device Client 109 can access the Private Cloud Server 108, it looks up the Intermediate Routing Server 112 to locate the public IP address of the Private Cloud Server 108, as in step 202. It then can start accessing, as in step 203, the predetermined port of the Router_P 102, which is correctly mapped to the private IP address of the Private Cloud Server 108.

The configuration of the Router_P 102 and the setup of the Intermediate Routing Server 112 are not really trivial and can be very difficult for most of the end users. Further, by mapping the private IP address of the Private Cloud Server 108 to a port that is directly and permanently addressable by the outside world, it conceivably creates a big security risk for the Private Cloud Server 108.

The Private Cloud Server 108 is directly and permanently exposed to the outside world that can invite many vicious attacks. Also, the Intermediate Routing Server 112 is a public cloud based server. It creates a number of concerns to the Smart Device Client 109 owner. First, the sense of trust is always in question, because the Intermediate Routing Server 112 is a middleman during all communication transactions between the Smart Device Client 109 and the Private Cloud Server 108. It may hold all user account information, password and their corresponding IP addresses of the Smart Device Client 109 and the Private Cloud Server 108. The Intermediate Routing Server 112 is able to sniff any communication in-between and render it insecure.

Second, being an outside and public cloud based routing server, the business model of the Intermediate Routing Server 112 may not always be in-line or in-sync with the Smart Device Client 109 owner. If the Intermediate Routing Server 112 is out of service due to any business reason, there is no remedy or option of replacement to restore the service. It potentially poses a tremendous business risk to the user, as the vital link in the communication can be broken without recourse.

Figure 3:
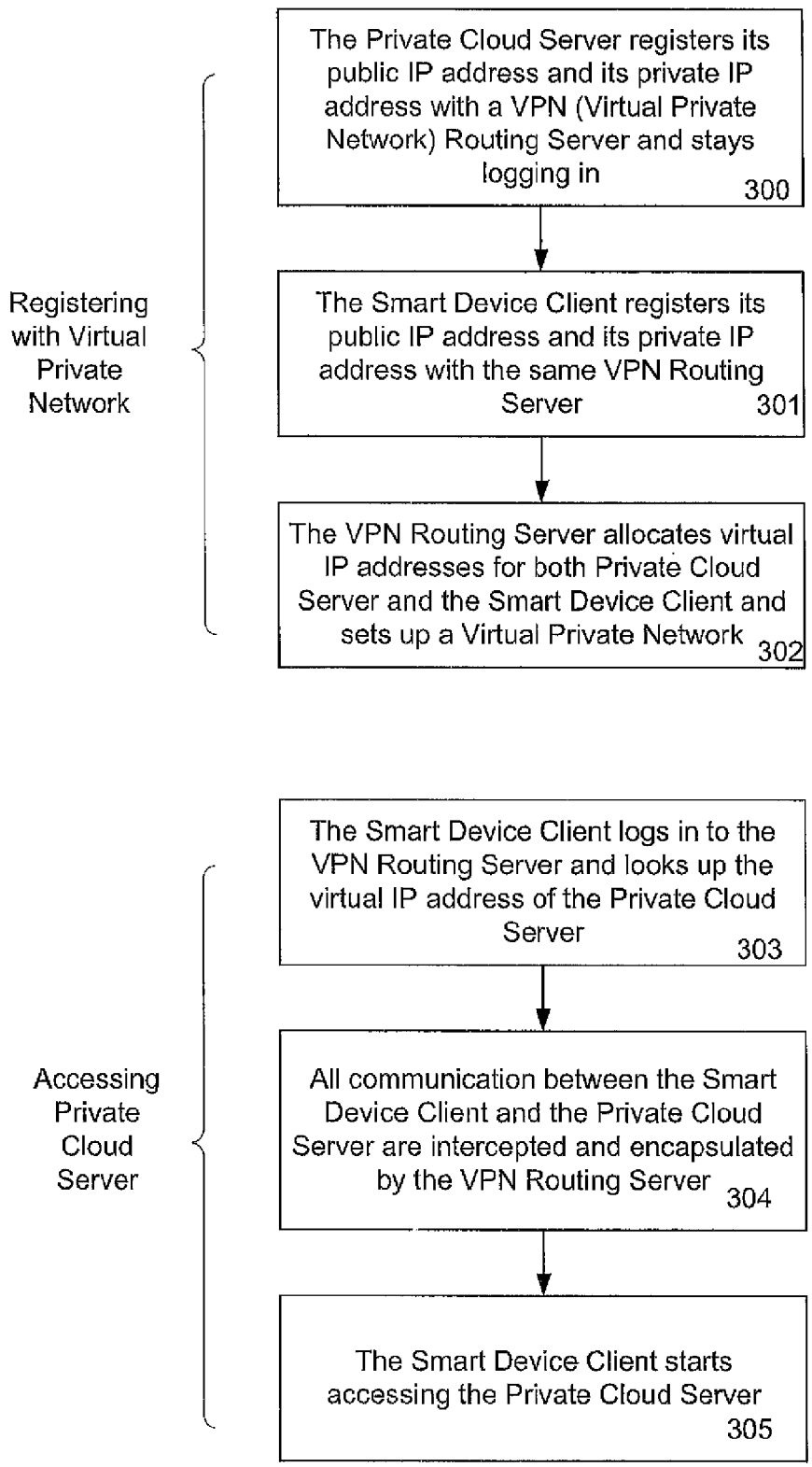
FIG. 3 shows a conventional implementation of how the Private Cloud Server can be accessed logically through registration with a VPN Routing Server.

FIG. 3 shows a conventional implementation of how the Private Cloud Server 108 can be accessed logically through registration with a VPN Routing Server 114. During setup of a virtual private network, the Private Cloud Server 108 first registers its public IP address and its private IP address with a VPN (virtual private network) Routing Server 114 and stays logging in, as in 300. The Smart Device Client 109 also registers its public IP address and its private IP address with the same VPN Routing Server 114, in step 301. The VPN Routing Server 114 allocates virtual IP addresses for both Private Cloud Server and the Smart Device Client 109 and sets up a Virtual Private Network 302. By this time, the Smart Device Client 109 and the Private Cloud Server 108 are in the same virtual IP domain under the control of the VPN Routing Server 114. All communication between the Smart Device Client 109 and the Private Cloud Server 108 are encapsulated under the VPN protocol.

The Smart Device Client 109 then logs in to the VPN Routing Server 114 and looks up the virtual IP address of the Private Cloud Server 108, in step 303. All communication between the Smart Device Client 109 and the Private Cloud Server 108 are intercepted and encapsulated by the VPN Routing Server 114, in step 304. The Smart Device Client 109 can then start accessing the Private Cloud Server 108, as in step 305.

As opposed to the approach disclosed in FIG. 2, the VPN Routing Server approach benefits by eliminating the router configuration. It therefore makes the setup much easier for the user. But it suffers the same, if not more serious business concerns on the issue of having to have all communication going through a public cloud based routing server. Being a public cloud based server, the VPN Routing Server 114 creates a number of concerns to the Smart Device Client 109 owner. First, the sense of trust is always in question, because the VPN Routing Server 114 is a middleman during all communication transactions between the Smart Device Client 109 and the Private Cloud Server 108. It may hold all user account information, password and their corresponding IP addresses of the Smart Device Client 109 and the Private Cloud Server 108. The VPN Routing Server 114 is able to sniff any communication in-between and render it insecure. Second, being an outside and public cloud based routing server, the business model of the VPN Routing Server 114 may not always be in-line or in-sync with the Smart Device Client 109 owner. If the VPN Routing Server 114 is out of service due to any business reason, there is no remedy or option of replacement to restore the service. Unless the user has total control over the VPN routing server, it potentially poses a tremendous business risk to the user, as the vital link in the communication can be broken without recourse.

Figure 4:
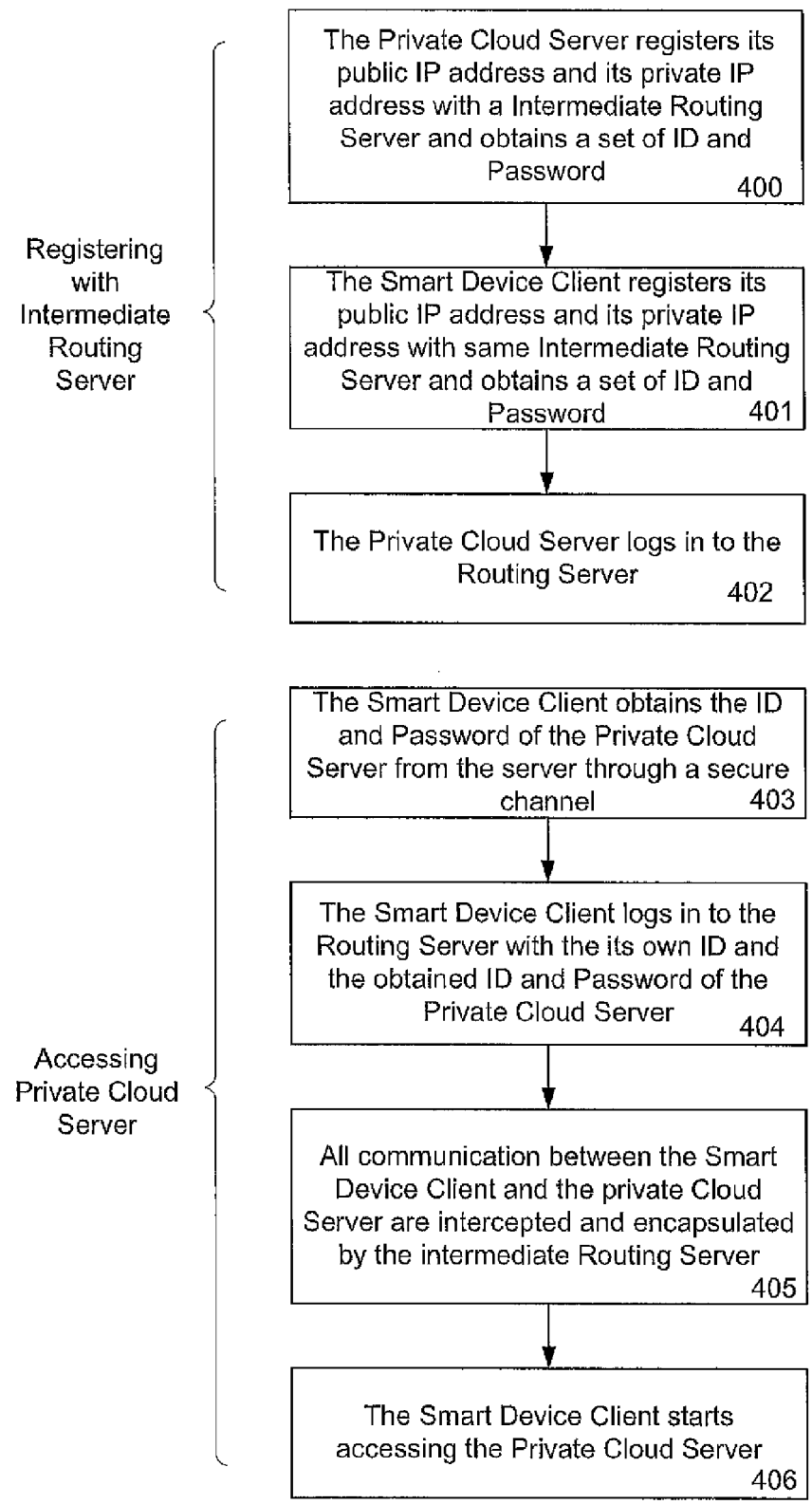
FIG. 4 shows an implementation of how the Private Cloud Server can be accessed logically through registration with an Intermediate Routing Server.

FIG. 4 shows an implementation of how the Private Cloud Server 108 can be accessed logically through registration with an Intermediate Routing Server 112. The Private Cloud Server 108 first registers its public IP address and its private IP address with an Intermediate Routing Server 112 and obtains a set of ID and Password from the server, in step 400. The Smart Device Client 109 then registers its public IP address and its private IP address with the same Intermediate Routing Server 112 and obtains a set of ID and Password, as in step 401. The Private Cloud Server 108 logs in to the Intermediate Routing Server 112, as in step 402.

Before the Smart Device Client 109 is able to access the Private Cloud Server 108, a number of steps have to happen. First, the Smart Device Client 109 obtains the ID and Password of the Private Cloud Server 108 from the server through a secure channel, such as phone call, email, text message or snail mail, as in step 403. The Smart Device Client 109 then logs in to the Intermediate Routing Server 112 with its own ID and the obtained ID and Password of the Private Cloud Server 108, as in step 404. All communication between the Smart Device Client 109 and the Private Cloud Server 108 are intercepted and encapsulated by the Intermediate Routing Server 112, as in step 405. Finally, the Smart Device Client 109 can start accessing the Private Cloud Server 108, as in step 406.

As opposed to the conventional approach shown in FIG. 2, the Intermediate Routing Server approach benefits from doing away with the router configuration. It therefore makes the setup much easier for the user. But it suffers the same, if not more serious business concerns on the issue of having to have all communication going through a public cloud based routing server.

Being a public cloud based server, the Intermediate Routing Server 112 creates a number of concerns to the Smart Device Client 109 owner. First, the sense of trust is always in question, because the Intermediate Routing Server 112 is a middleman during all communication transactions between the Smart Device Client 109 and the Private Cloud Server 108. It may hold all user account information, password and their corresponding IP addresses of the Smart Device Client 109 and the Private Cloud Server 108. The Intermediate Routing Server 112 is able to sniff any communication in-between and render it insecure.

Second, being an outside and public cloud based routing server, the business model of the Intermediate Routing Server 112 may not always be in-line or in-sync with the Smart Device Client 109 owner. If the Intermediate Routing Server 112 is out of service due to any business reason, there is no remedy or option of replacement to restore the service. It potentially poses a tremendous business risk to the user, as the vital link in the communication can be broken without recourse.

Figure 5:
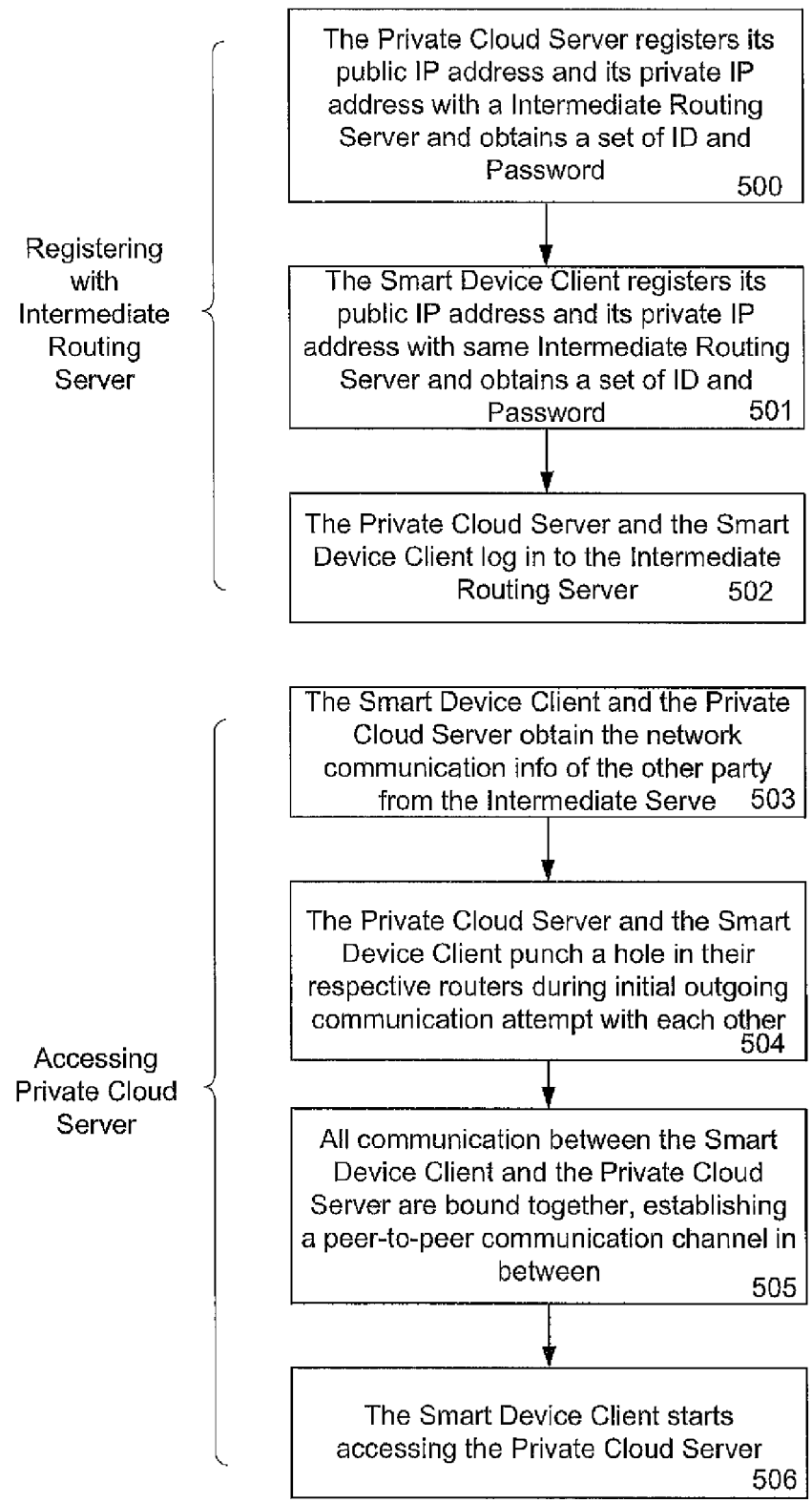
FIG. 5 shows a conventional implementation of how the Private Cloud Server can be accessed logically through peer-to-peer communication registering with an Intermediate Routing Server.

FIG. 5 shows an implementation of how the Private Cloud Server 108 can be accessed logically through peer-to-peer communication registering with an Intermediate Routing Server 112. The Private Cloud Server 108 first registers its public IP address and its private IP address with an Intermediate Routing Server 112 and obtains a set of ID and Password from the server, in step 500. The Smart Device Client 109 then registers its public IP address and its private IP address with the same Intermediate Routing Server 112 and obtains a set of ID and Password, as in step 501. The Private Cloud Server 108 and the Smart Device Client 109 log in to the Intermediate Routing Server 112, as in step 502.

Before the Smart Device Client 109 is able to access the Private Cloud Server 108, a number of steps have to happen. First, the Smart Device Client 109 and the Private Cloud Server 108 obtain the public IP and private IP addresses of the other party from the Intermediate Routing Server, as in step 503. Both parties punch a hole in their respective routers during initial outgoing communication attempt with each other, as in step 504. All communication between the Smart Device Client 109 and the Private Cloud Server 108 are bound together, establishing a peer-to-peer communication channel in between, as in step 505. Finally, the Smart Device Client 109 can start accessing the Private Cloud Server 108, as in step 506.

As opposed to the conventional approaches of FIG. 2, FIG. 3 and FIG. 4, the Intermediate Routing Server approach of this embodiment has the benefit of establishing peer-to-peer communication between the client and the server and offers better performance. But it still suffers from the problem of "single point of failure" where all communication go through a single public cloud based routing server. Being a public cloud based server, the Intermediate Routing Server 112 creates a number of concerns to the Smart Device Client 109 owner. First, the sense of trust is always in question, because the Intermediate Routing Server 112 is a middleman holding all user account information, password and their corresponding IP addresses of the Smart Device Client 109 and the Private Cloud Server 108.

Second, being an outside and public cloud based routing server, the business model of the Intermediate Routing Server 112 may not always be in-line or in-sync with the Smart Device Client 109 owner. If the Intermediate Routing Server 112 is out of service due to any business reason, there is no remedy or option of replacement to restore the service. It potentially poses a tremendous business risk to the user, as the vital link in the communication can be broken without recourse.

One of the biggest advantages of a system and method in accordance with the present invention over the above cited conventional approaches is to eliminate the role of the public cloud based routing server during access, as in the case of either the VPN Routing Server or the Intermediate Routing Server. Another advantage of the invention is that no secret information such as password of the account is ever exchanged between the Smart Device Client 109 and the Private Cloud Server 108.

Figure 1B:
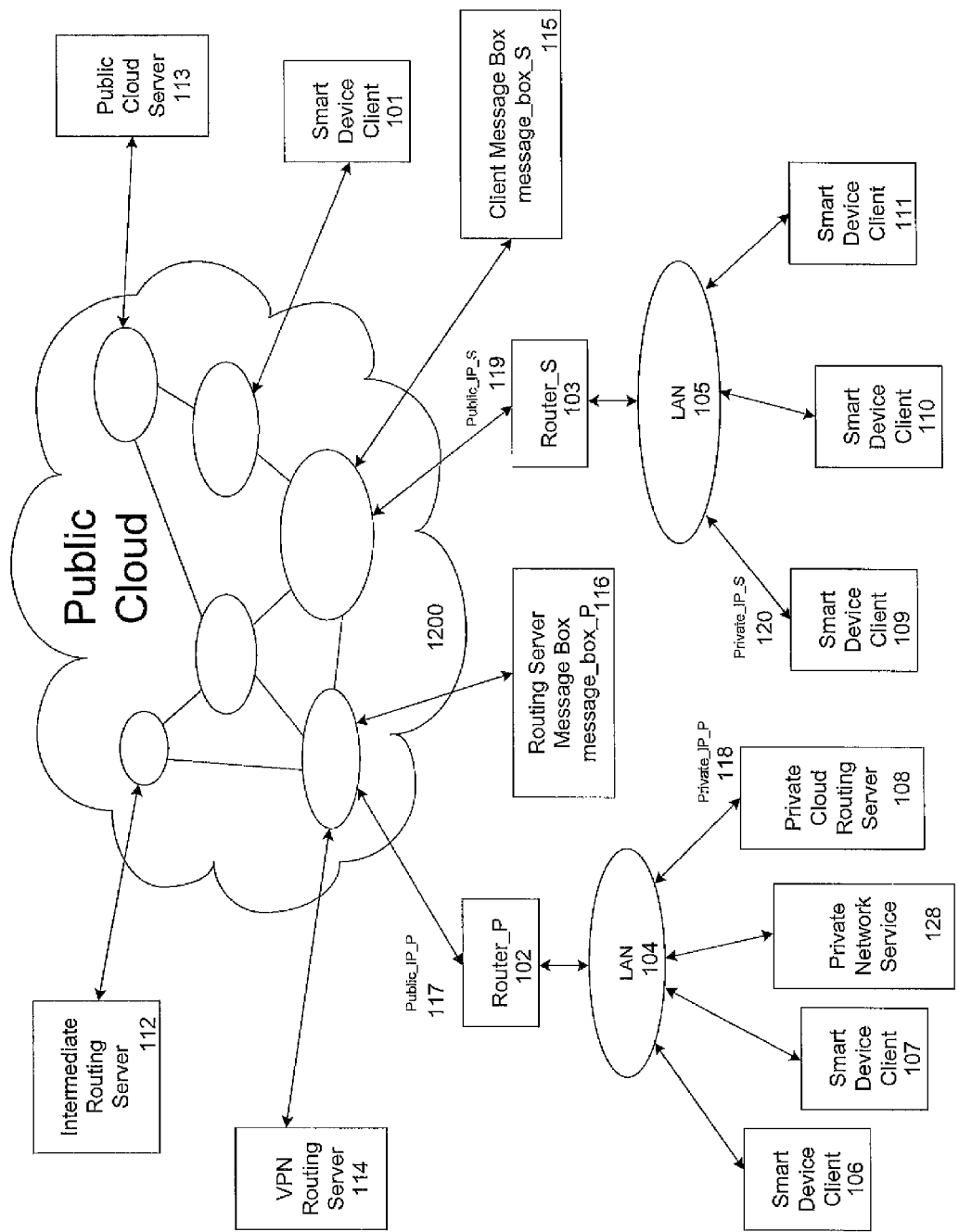
FIG. 1B is a block diagram of a Cloud Network Infrastructure in accordance with an embodiment.

FIG. 1B is a block diagram of a Cloud Network Infrastructure in accordance with an embodiment. Those elements that are the same as those described with respect to FIG. 1A have the same designators. However, in this embodiment, there are also two message boxes, Client Message Box message_box_S 115 and Routing Server Message Box message_box_ P 116 which purposes will be described in detail hereinafter.

As in FIG. 1A, behind the LAN 104, there are Smart Device Clients 106, 107, a Private Cloud Server Routing Server (PCRS) 108 and a Private Network Service (PNS) 128. The original Private Cloud Server (PCS) 108 in FIG. 1A has been changed to a Private Cloud Routing Server (PCRS) 108 and a Private Network Service 128 (PNS) in FIG. 1B. Behind the LAN 105, there are Smart Device Clients 109, 110 and 111. The Smart Device Client can be a PC, notebook, tablet, eBook reader, GPS, smart TV, set top box, MP3 player, or any networkable embedded device. They are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Figure 6:
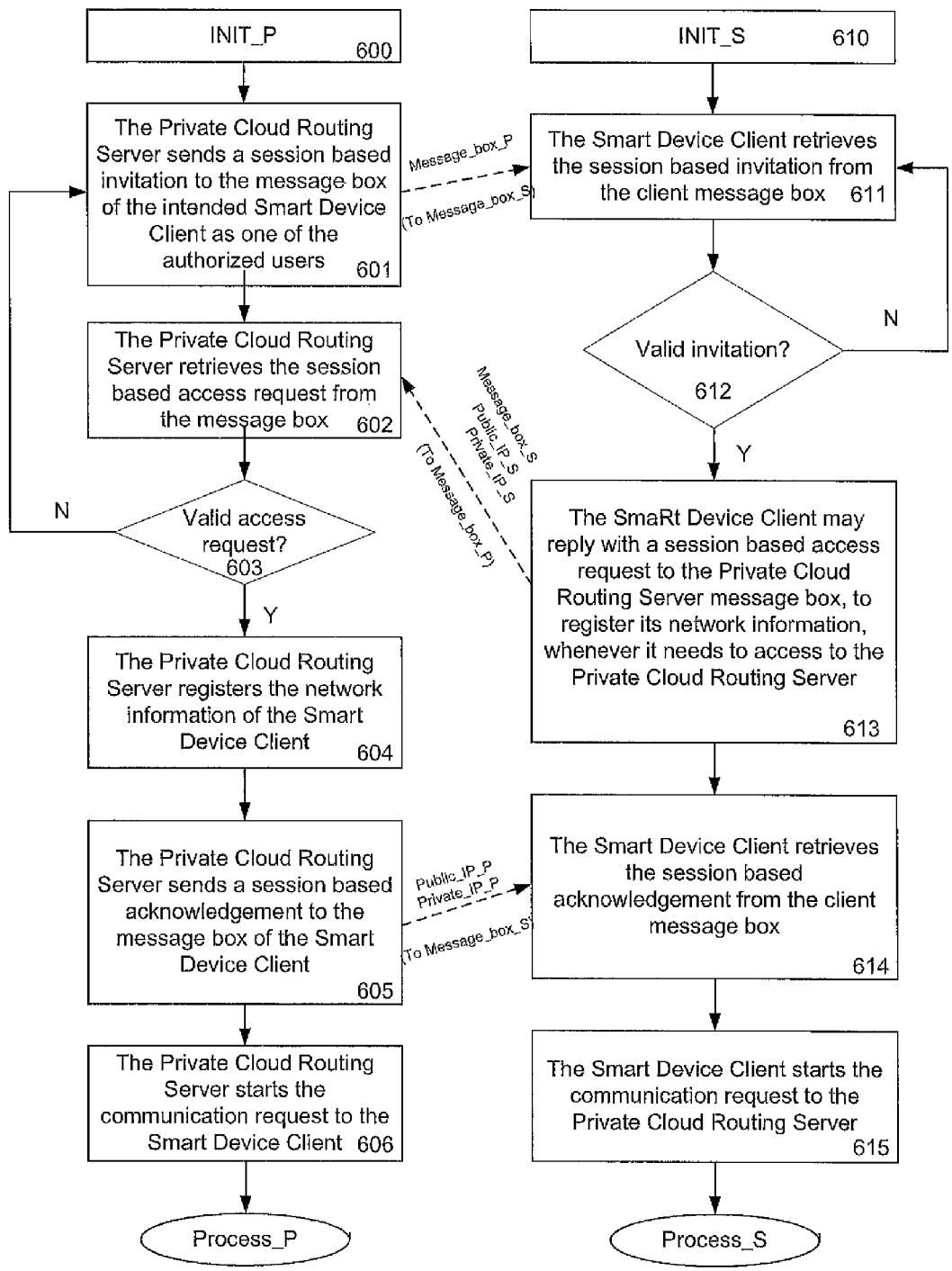
FIG. 6 illustrates an Initial Setup of the Private Cloud Server Routing Server and the Smart Device Client in accordance with the present invention.
Figure 7:
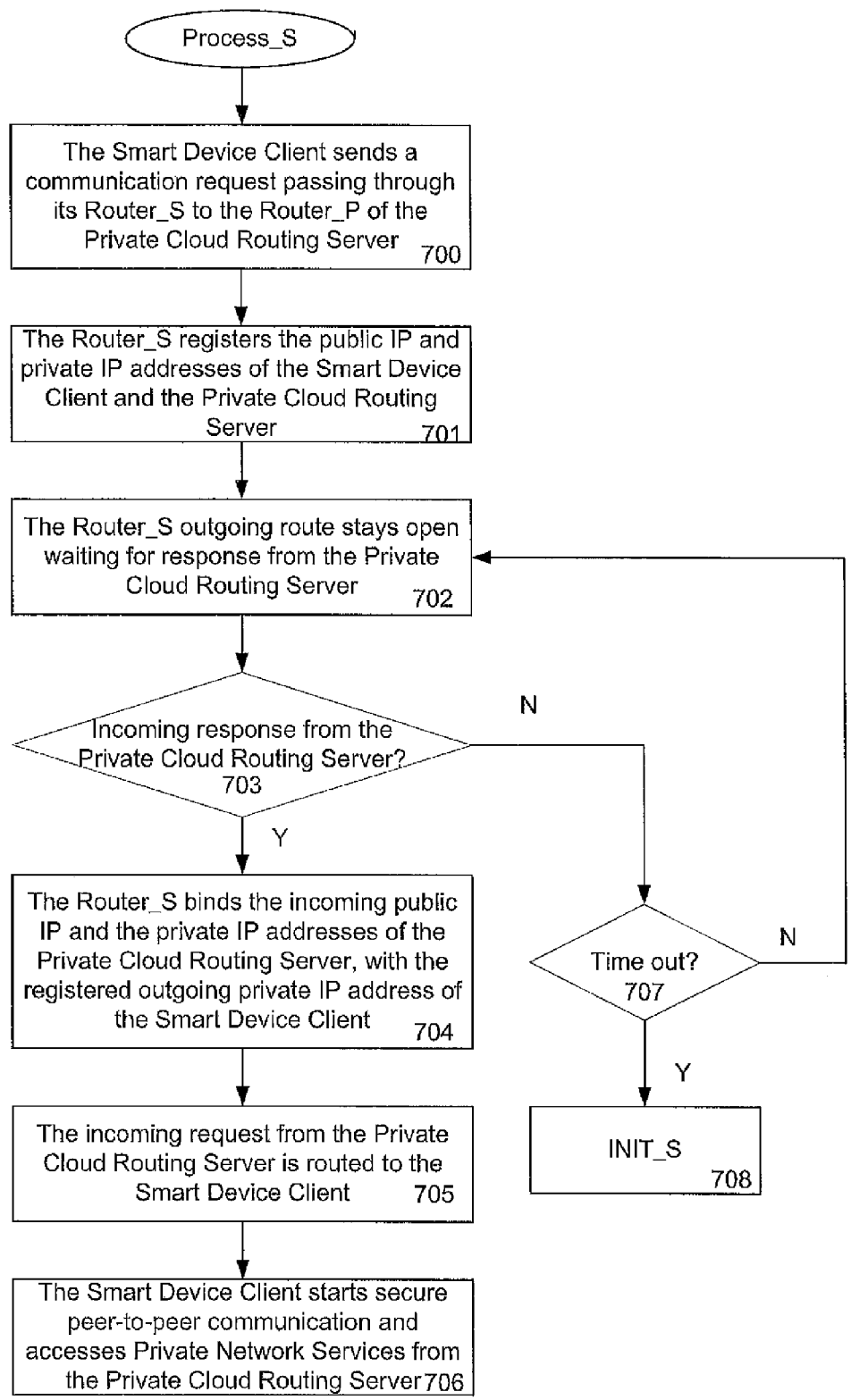
FIG. 7 shows the communication flow of the Smart Device Client in accordance with the present invention.
Figure 8:
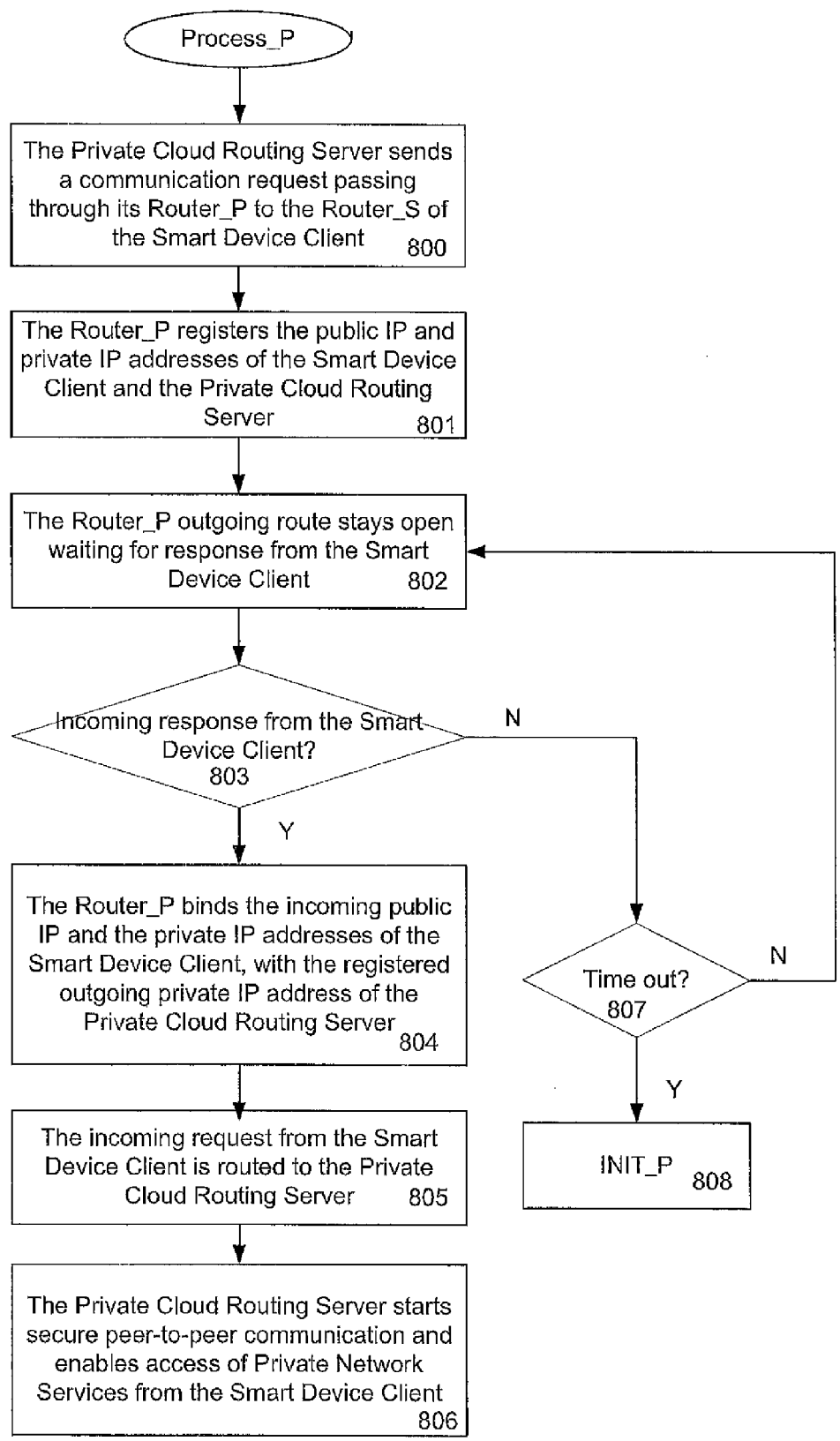
FIG. 8 shows the communication flow of the Private Cloud Routing Server in accordance with the present invention.

To describe the features of the present invention in more detail, refer now to FIG. 6, FIG. 7 and FIG. 8, which cover the initial setup phase and the access phase of the invention.

FIG. 6 illustrates an Initial Setup of the Private Cloud Routing Server 108 and the Smart Device Client 109 in accordance with the present invention. The Private Cloud Routing Server 108 and the Smart Device Client 109 form a server-client relationship. The Private Cloud Routing Server 108 first creates an authorized client list with the client account name and the corresponding message box information. The message box information can be in the form of an email account, text message account or other unique public account information of the client.

On the Private Cloud Routing Server 108 side, it sends a session based invitation to message_box_S 115 of the intended Smart Device Client 109 as one of the authorized users, in step 601. The session based invitation may include the routing server message box address message_box_P 116. The Private Cloud Routing Server 108 then attempts to retrieve session based access request that includes the client message box address message_box_S 115, client public IP Public_IP_S 119 and private IP private_IP_S 120 addresses from the routing server message box message_box_P 116, as in step 602.

If the access request is invalid, then it loops back to step 601. If the access request is valid, the Private Cloud Routing Server 108 then registers the client message box 115, public IP 119 and the private IP 120 addresses of the Smart Device Client 109, as in step 604. The Private Cloud Routing Server 108 sends to the client message box message_box_S 115, a session based acknowledgement with its current routing server public IP and private IP addresses, public_IP_P 117 and private_IP_P 118, as in step 605. The Private Cloud Routing Server 108 can start the communication request to the Smart Device Client 109, as in step 606.

On the Smart Device Client 109 side, it first retrieves the session based invitation from its own message_box_S 115, as in step 611. The session based invitation includes the message box address message_box_P 116 of the Private Cloud Routing Server. If the invitation from the Private Cloud Routing Server 108 is invalid, then it loops back to step 611. If the invitation is valid from the Private Cloud Routing Server 108, the Smart Device Client 109 may reply to the Private Cloud Routing Server 108 message box message_box_P 116 with a session based access request, to register its current client message box address, public IP and private IP addresses whenever it needs to access to the Private Cloud Routing Server 108, as in step 613. The session based access request may include the Smart Device Client 109 message box address, message_box_S 115, and the client public and private IP addresses, public_IP_S 119 and private_IP_S 120. The Smart Device Client 109 then retrieves from the client message_box_S 115, the session based acknowledgement with the Private Cloud Routing Server current public IP and private IP addresses, public_IP_P 117 and private_IP_P 118, as in step 614. The Smart Device Client 109 can start the communication request to the Private Cloud Routing Server, as in step 615. These two independent processes conclude the initial setup of the Private Cloud Routing Server 108 and the Smart Device Client 109.

The message box servers, hosting either server or client message boxes, can be an email server, text message server, or any kind of server that can host secure message for information exchange between the Private Cloud Routing Server 108, as a server, and the Smart Device Client 109, as a client. The security and business model of the message box server is well understood and expected in the industry by the user. For any reason the message box server is down, it can be replaced or redeployed immediately without jeopardizing the communication between the server and the client in the private cloud infrastructure.

FIG. 7 shows the communication flow of the Smart Device Client 109 in accordance with the present invention. The Smart Device Client 109 can start peer-to-peer communication with the Private Cloud Routing Server 108 without going through an Intermediate Routing Server 112 or a VPN Routing Server 114. The Smart Device Client 109 first sends a communication request passing through its Router_S 103 to the Router_P 102 of the Private Cloud Routing Server 108, as in step 700. The Router_S 103 registers the public IP and private IP addresses of the Smart Device Client 109 and the Private Cloud Routing Server 108, as in step 701. The Router_S 103 outgoing route stays open, punching a hole and waiting for response from the Private Cloud Routing Server 108, as in step 702. The Router_S 103 then checks if the incoming response is from the Private Cloud Routing Server 108, as in step 703. If the incoming response is invalid and it has timed out, then the initialization process of the Smart Device Client 109 starts over again, as in step 708. If it has not timed out, then it loops back to step 702. But, if the incoming response is valid, the Router_S 103 will bind the incoming public IP address and the private IP address of the Private Cloud Routing Server 108, with the registered outgoing private IP address of the Smart Device Client 109, as in step 704. The incoming request from the Private Cloud Routing Server 108 is then routed to the Smart Device Client 109, as in step 705. The Smart Device Client 109 can start secure peer-to-peer communication with the Private Cloud Routing Server 108 and access services from it, as in step 706.

FIG. 8 shows the communication flow of the Private Cloud Routing Server 108 in accordance with the present invention. The Private Cloud Routing Server 108 can start peer-to-peer communication with the Smart Device Client 109 without going through an Intermediate Routing Server 112 or a VPN Routing Server 114. The Private Cloud Routing Server 108 first sends a communication request passing through its Router_P 102 to the Router_S 103 of the Smart Device Client 109, as in step 800. The Router_P 102, in response to the outgoing communication request, then registers the public IP and private IP addresses of the Smart Device Client 109 and the Private Cloud Routing Server 108, as in step 801. The Router_P 102 outgoing route stays open, punching a hole and waiting for response from the Smart Device Client 109, as in step 802. The Router_P 102 checks for incoming response to see if it is from the Smart Device Client 109, as in step 803. If the incoming response is invalid and it has timed out, then the initialization process of the Private Cloud Routing Server 108 starts over again, as in step 808. If it has not timed out, then it loops back to step 802. But, if the incoming response is valid, the Router_P 102 will bind the incoming public IP address and the private IP address of the Smart Device Client 109, with the registered outgoing private IP address of the Private Cloud Routing Server 108, as in step 804. The incoming request from the Smart Device Client 109 is then routed to the Private Cloud Routing Server 108. The Private Cloud Routing Server 108 can start secure peer-to-peer communication with the Smart Device Client 109 and accept access of services from it, as in step 806.

In order to ensure the peer-to-peer communication channel secure, a number of security measures are deployed, including AES encryption and/or SSL (secure socket layer), TLS (transport layer security). The session based communication between the server and client, including invitation, access request and acknowledgment, also utilizes random number seeds, time stamp, encryption and hashing to defeat man-in-the middle and reply attack from the public cloud based to ensure the security and integrity of the communication.

Because the invention does not rely on a public cloud based routing server, it solves and eases a number of concerns to the Smart Device Client owner. First, there is no single point of failure between the client and the server. Second, there is no middleman during any communication transactions between the Smart Device Client 109 and the Private Cloud Routing Server 108. The performance is therefore better. Third, no sniffing of any communication in-between is possible and therefore makes the process very secure for the client and server. The user account information, password and their corresponding IP addresses of the Smart Device Client 109 and the Private Cloud Routing Server 108 are never exposed to a public cloud based. The only outside communication channels utilized in information exchange between the Smart Device Client 109 and the Private Cloud Routing Server 108 are the two private message boxes message_box_S 115 and message_box_P 116. The password information is never exchanged between the Private Cloud Routing Server 108 and the Smart Device Client 109, as a client. The security of the communication is as good as the message box servers hosting message_box_S 115 and message_box_P 116. If for any reason either message box is compromised or out of service, another replacement or backup message box can be deployed immediately. In this invention, any key component, including router, network switch, message box, Smart Device Client 109, or even Private Cloud Routing Server 108, can be replaced without affecting the efficiency and integrity of the communication link between the Smart Device Client 109 and the Private Cloud Routing Server 108.

Figure 9:
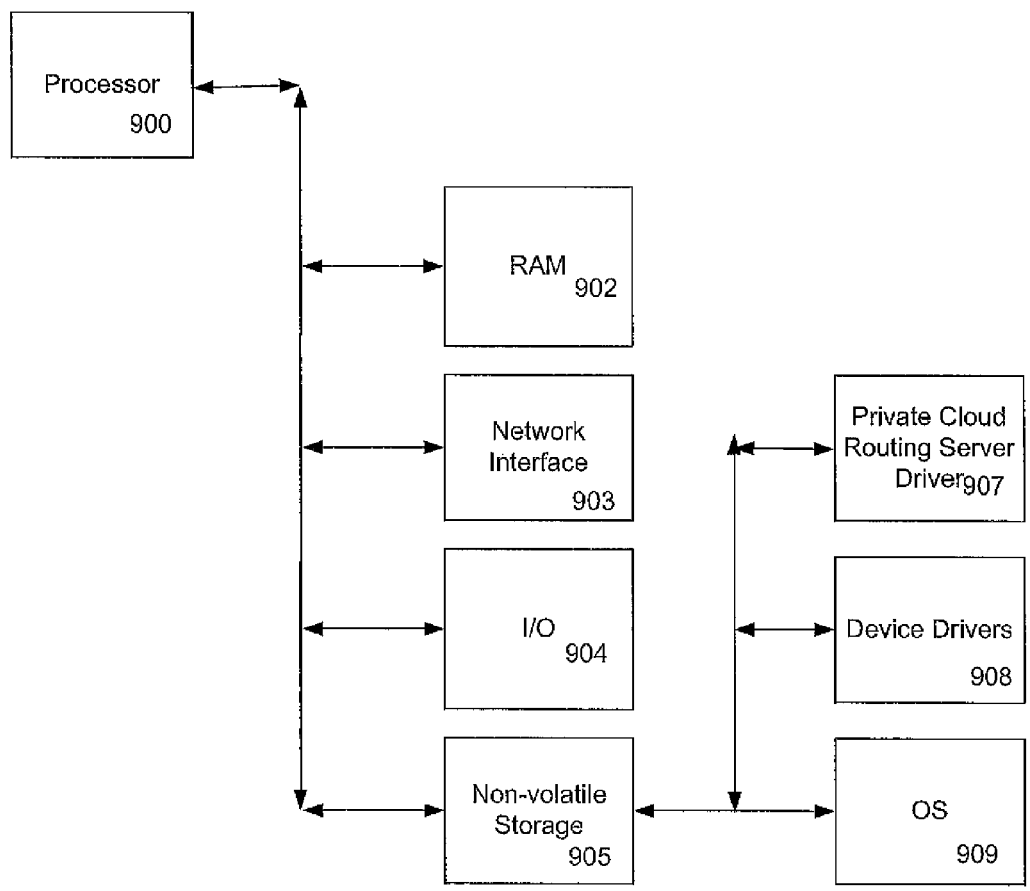
FIG. 9 shows a block diagram of the Private Cloud Routing Server in accordance with the present invention.

FIG. 9 shows a block diagram of the Private Cloud Routing Server 108 in accordance with the present invention. It includes a processor 900, RAM 902, network interface 903, input/output (I/O) 904, and non-volatile storage 905. The non-volatile storage 905 further contains an operating system (OS) 909, device driver 908, and private cloud routing server driver 907.

The network interface 903 can connect to LAN, WAN or 3G/4G network. The I/O 904 is for user interface to the outside world, including input/output devices such as keyboard, mouse, audio and video. The non-volatile storage 905 is loaded with necessary software including OS and various device drivers.

The Private Cloud Routing Server Driver 907 is deployed to communicate with the corresponding Private Cloud Client Driver from the Smart Device Client 109. The Private Cloud Routing Server Driver 907 initiates invitation, processes the access request, and then sends acknowledgement back to the Smart Device Client 109. Later, it sends communication request to the Smart Device Client 109 and opens a hole in its router in the outgoing direction. Once the incoming request from the Smart Device Client reaches the opened hole, the two-way communication channel is bound together. The Private Cloud Routing Server Driver 907 can start secure peer-to-peer communication with the Smart Device Client 109.

Figure 10:
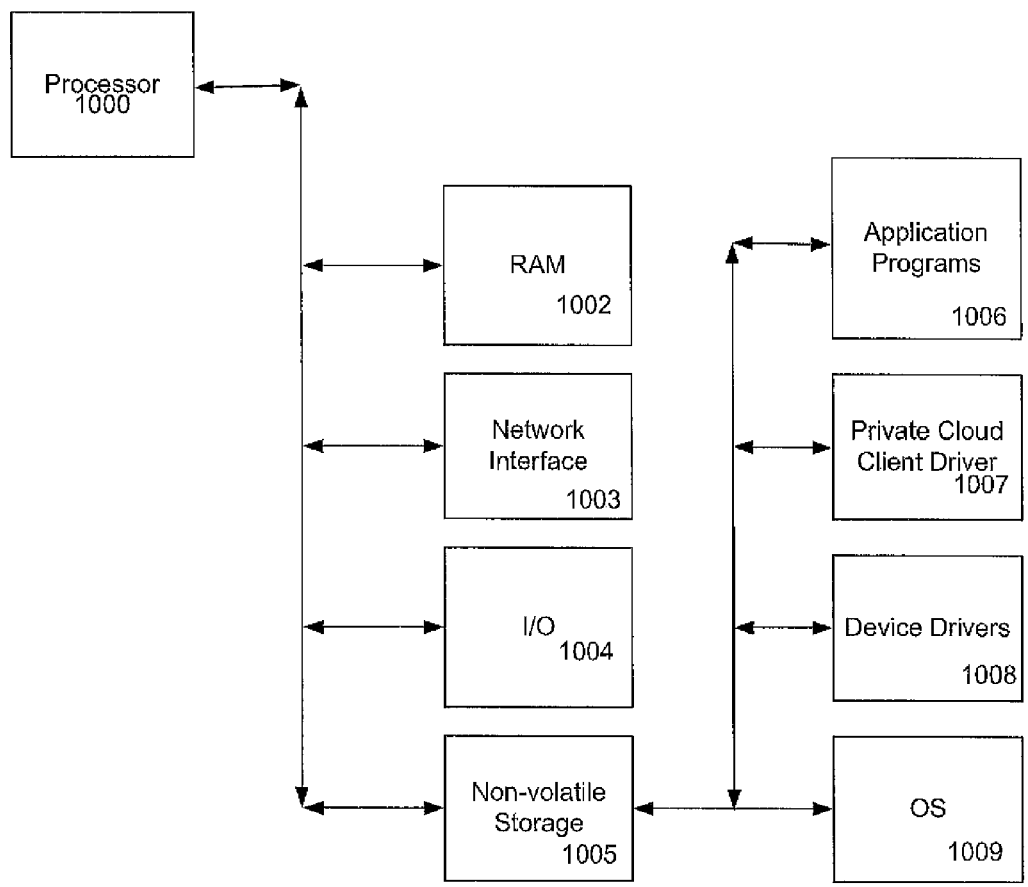
FIG. 10 shows a block diagram of the Smart Device Client in accordance with the present invention.

FIG. 10 shows a block diagram of the Smart Device Client 109 in accordance with the present invention. The Smart Device Client 109 includes a processor 1000, RAM 1002, network interface 1003, input/output (I/O) 1004, and non-volatile storage 1005. The non-volatile storage 1005 further contains an operating system (OS) 1009, device driver 1008, and Private Cloud Client Driver 1007. The Smart Device Client 109 will also be loaded with Application Programs 1006 to communicate with the Private Cloud Routing Server 108. The network interface 1003 can connect to LAN, WAN or 3G/4G network.

The I/O 1004 is for user interface to the outside world, including input/output devices such as touch pad, audio and video. The non-volatile storage can be hard disk storage or flash based solid state disk. Inside the non-volatile storage 1005, it is loaded with necessary software including OS and device drivers. The Private Cloud Client Driver 1007 is deployed to communicate with the corresponding Private Cloud Routing Server Driver 907 from the Private Cloud Routing Server 108. The Private Cloud Client Driver 1007 responds to server invitation, replies with the access request, and then accepts acknowledgement from the Private Cloud Routing Server 108. Later, it sends communication request to the Private Cloud Routing Server 108 and opens a hole in its router in the outgoing direction.

Once the incoming request from the Private Cloud Routing Server 108 reaches the opened hole, the two-way communication channel is bound together. The Smart Device Client 109 can start secure peer-to-peer communication with the Private Cloud Routing Server 108. The Private Network Service 128 is then manageable or accessible by the Smart Device Client through the Public Cloud 100. The wording or access or accessible covers the meaning of manage or manageable throughout the text.

For performance consideration, the Private Cloud Routing Server 108 and the corresponding router Router_P 102 can be one entity in certain environment. In either case, any reachable Private Network Services by the Private Cloud Routing Server 108 is accessible by the Smart Device Client through the Public Cloud 100.

Figure 11:
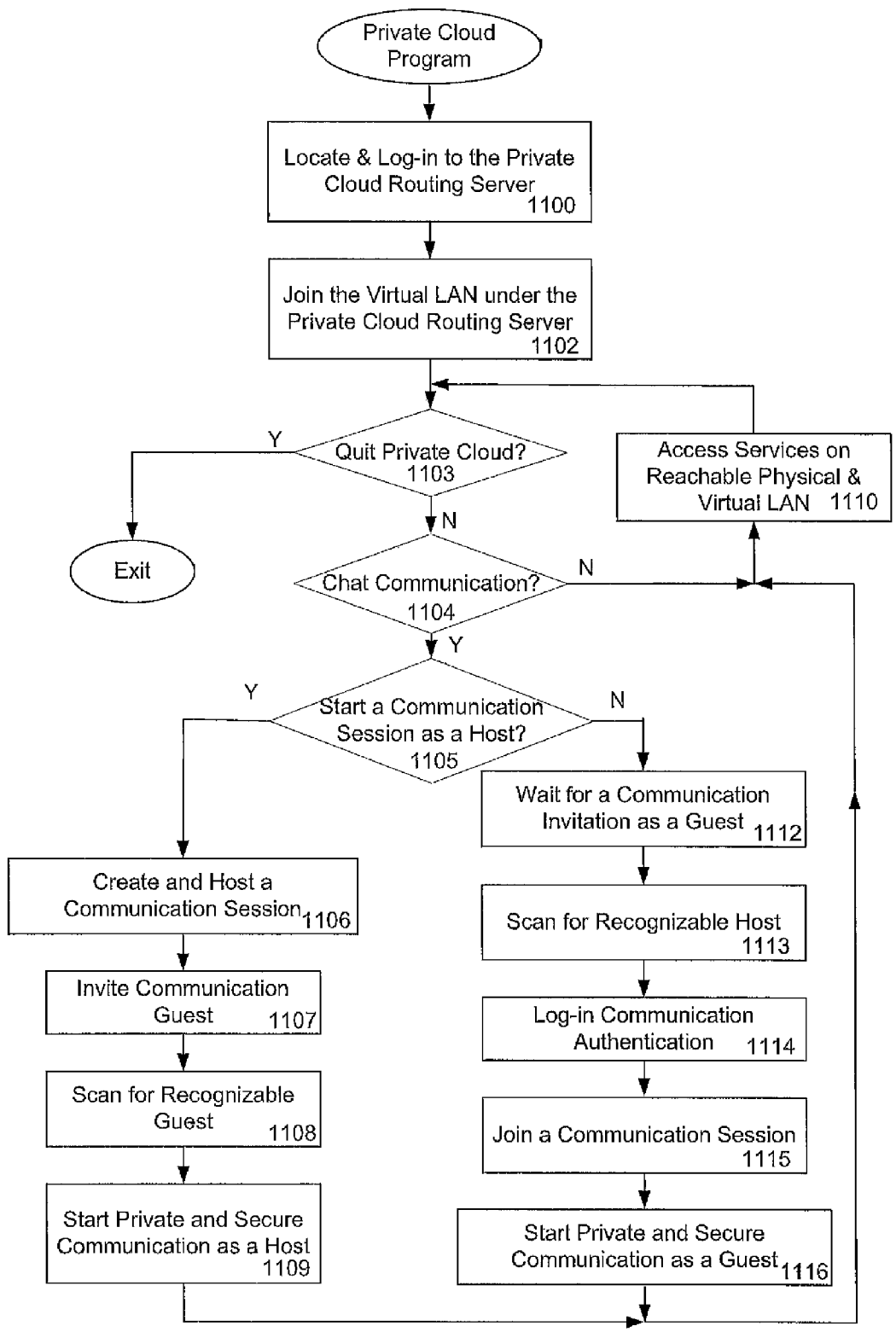
FIG. 11 shows a communication flow of the Smart Device Client as a host or host or guest conducting a private and secure communication in accordance with the present invention

FIG. 11 shows a communication flow of the Private Cloud Program installed on a Smart Device Client. The Private Cloud Program provides three functionalities for the Smart Device Client. The functionalities include how to start a communication session as a host, how to join a communication session as a guest and accessing services reachable on the physical LAN or virtual LAN under the Private Cloud Routing Server. The left hand side of the communication flow shows how a host Smart Device Client starts a communication session. The lower right hand side of the communication flow shows how a guest Smart Device Client receives a communication invitation and joins the communication session.

Figure 12:
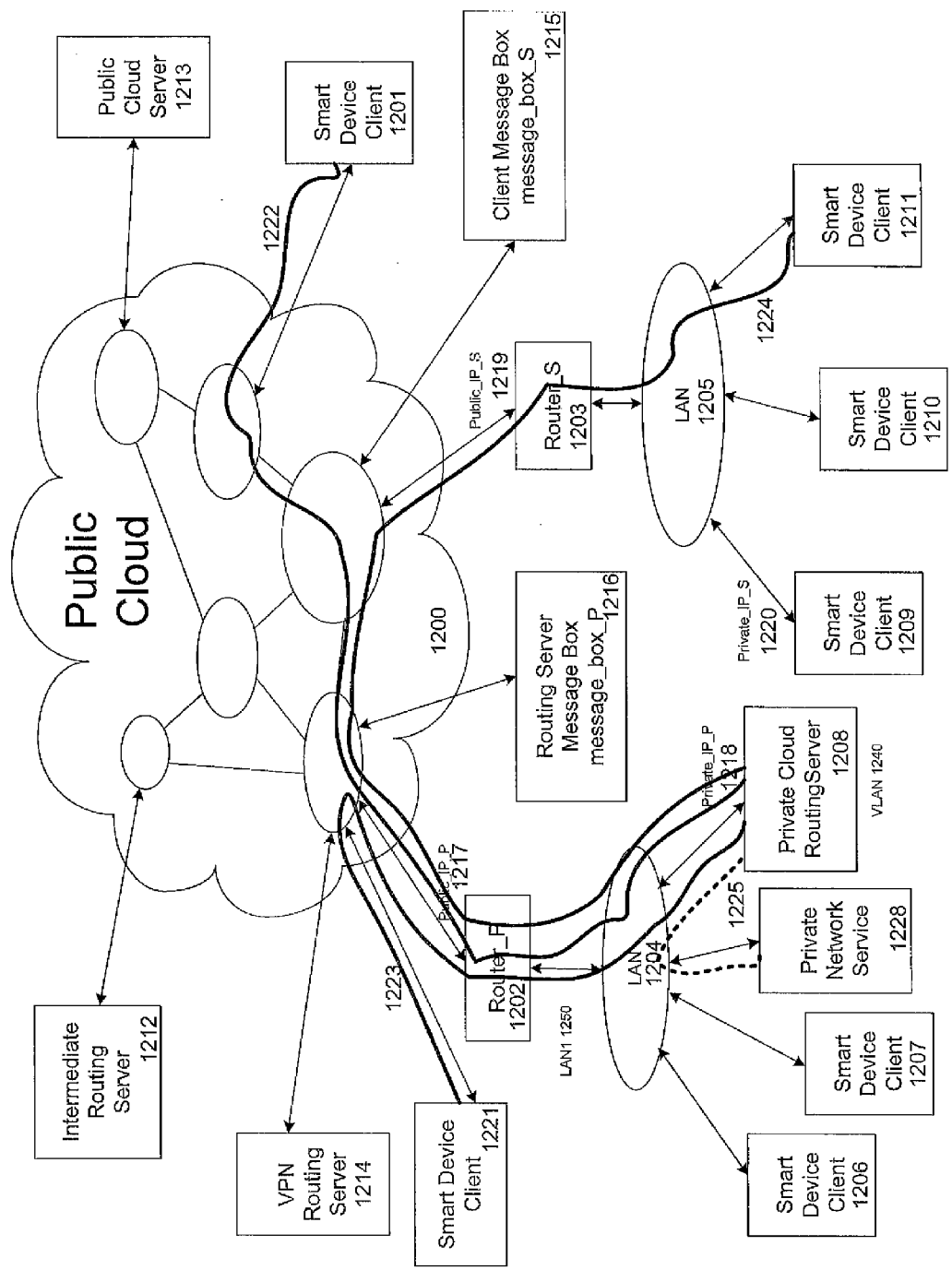
FIG. 12 is a block diagram of a first embodiment Cloud Network Infrastructure for the private and secure communication in accordance with the present invention

FIG. 12 shows a block diagram of a first embodiment of a Cloud Network Infrastructure for the private and secure communication between Smart Devices Clients and the exploring and accessing of Private Network Service across the public cloud. The Smart Device Client 1201, 1211 and 1221, through the communication path 1222, 1224 and 1223 respectively are able to locate the Private Cloud Routing Server 1208 with the above mentioned mechanism in FIGS. 6, 7 and 8. The Private Cloud Routing Server 1208 then builds a virtual LAN VLAN 1240 allowing the authorized Smart Device Clients 1201, 1211 and 1221 to join in as members of the virtual LAN VLAN 1240. The Smart Device Client 1201 through the installed program can initiate a private and secure communication as a host. The Smart Device Client 1211 or 1221 through the installed program can receive the communication invitation as a guest and join the private and secure communication session with the host Smart Device Client 1201.

As shown in FIGS. 11 & 12, when a Smart Device Client 1201 wants to start a communication session as a host, the program installed on the host Smart Device Client first locates and logs-in to the Private Cloud Routing Server (PCRS) 1100 through the communication path 1222. After locating the Private Cloud Routing Server 1208, it joins the virtual LAN VLAN 1240 under the server in step 1102. The Smart Device Client commits to join chat communication as a host 1104, 1105. The program allows the Smart Device Client 1201 to create and host a communication session 1106. The program broadcasts the host session to invite communication guest 1107. Afterwards, the program starts scanning for recognizable guest 1108. Once the guest is authenticated, the Smart Device Client 1201 can start private and secure communication 1109 as a host with the authenticated guest Smart Device Client. The private and secure communication includes video, audio, text or application. The application can be a program, utility, operation or remote desktop that is recognizable by both host and guest.

If the Smart Device Client 1211 or 1221 wants to join a communication session as a guest 1104, 1105, the program installed on the guest Smart Device Client first locates and logs-in to the Private Cloud Routing Server (PCRS) 1100 through the communication path 1224 or 1223 respectively. After locating the Private Cloud Routing Server 1208, it joins the virtual LAN VLAN 1240 under the server in step 1102. The Smart Device Client commits to join chat communication as a client 1104, 1105. The program waits for a communication invitation 1112. Once it receives a communication invitation, the Smart Device Client 1211 or 1221 may join a communication session as a guest. The program then starts scanning for recognizable host 1113. Upon identifying the host, the program goes through the communication log-in authentication prompted by the host 1114. Once authenticated, the Smart Device Client can join the communication session 1115. The Smart Device Client 1211, 2121 starts private and secure communication as a guest 1116 with the host Smart Device Client 1201. The private and secure communication includes video, audio, text or application. The application can be a program, utility, operation or remote desktop that is recognizable by both host and guest.

In another embodiment of the invention, the Smart Device Client can establish a private and secure communication with any service that is reachable on the physical LAN, LAN1 1250 or virtual LAN VLAN 1240 under the Private Cloud Routing Server. As shown in FIGS. 11 & 12, once the Smart Device Client 1201, 1211 or 1221 locates and logs-in to the Private Cloud Routing Server 1208, it may access any Private Network Service 1110, 1228 that is reachable on the physical LAN, LAN1 1250, LAN2 1260 virtual LAN VLAN 1240 under the Private Cloud Routing Server through the communication path 1225. The Private Network Service includes audio, video contents, live or archived information, and execution of applications, social media, messaging, email, storage, backup, calendar, contact, synchronization, sharing, remote desktop, Internet of Things (IoT) and others.

Figure 13:
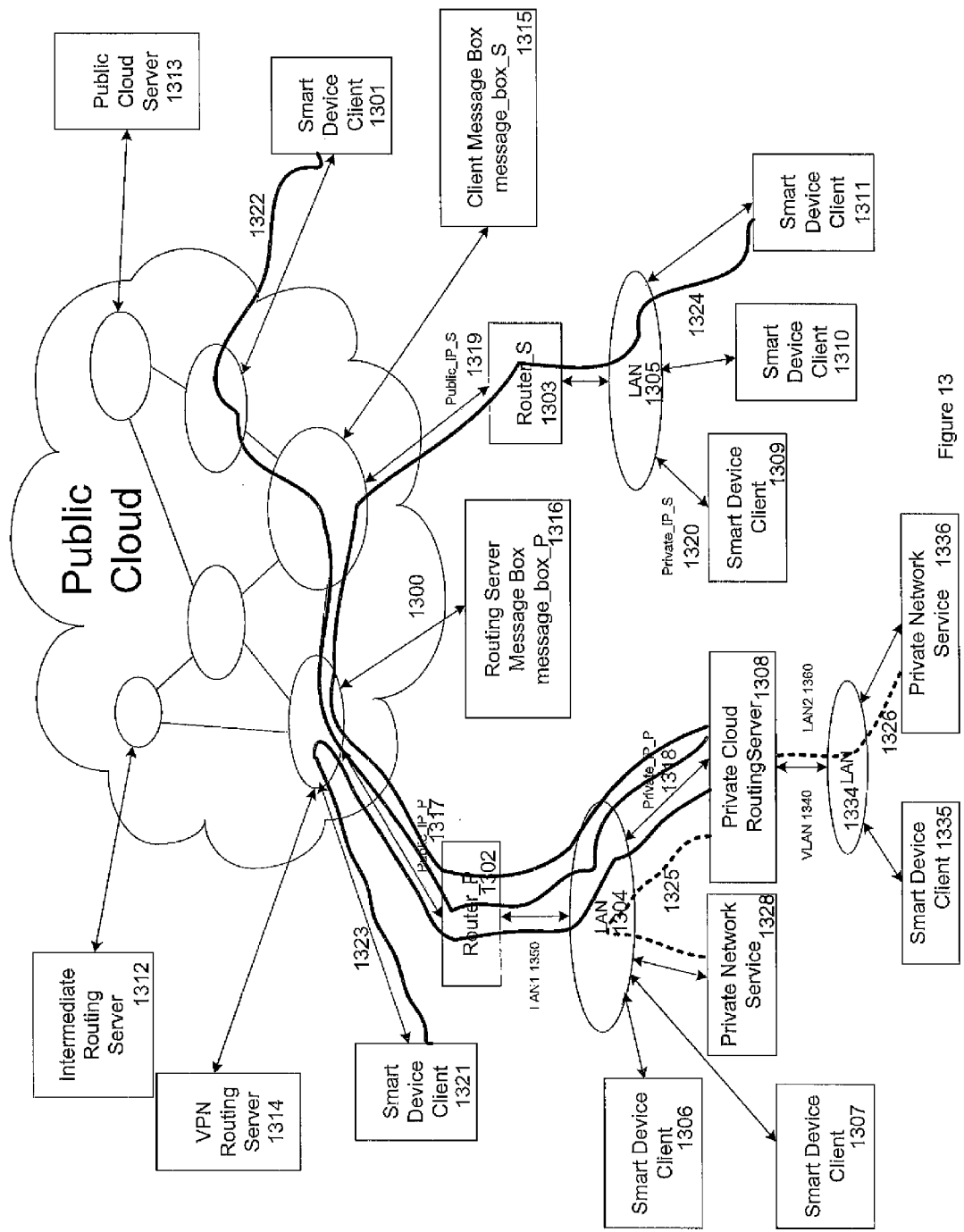
FIG. 13 is a block diagram of a second embodiment of a Cloud Network Infrastructure for the private and secure communication in accordance with the present invention

FIG. 13 shows a block diagram of a second embodiment of the invention. The Private Cloud Routing Server 1308 connects to the LAN of a Router_P 1302, in a manner similar to the way Private Cloud Routing Server 1208 connects to the LAN of a Router_P 1202 in FIG. 12. The PCRS 1308 also has a physical LAN LAN2 1360 connecting downstream. A Private Network Service 1336 and a Smart Device Client 1335 are connected downstream. The Private Network Service 1336 is accessible through the communication path 1326, connecting through LAN 1334 to Private Cloud Routing Server 1308. As long as the virtual LAN 1340, the physical LAN LAN1 1350, and physical LAN LAN2 1360 are all explorable and accessible by the Smart Device Clients 1311, 1310, 1309, 1301, 1321, 1306, and 1335 across the cloud through the Private Cloud Routing Server 1308, all Private Network Service 1328, 1336, and Smart Device Client 1306, 1335 become accessible.

Figure 14:
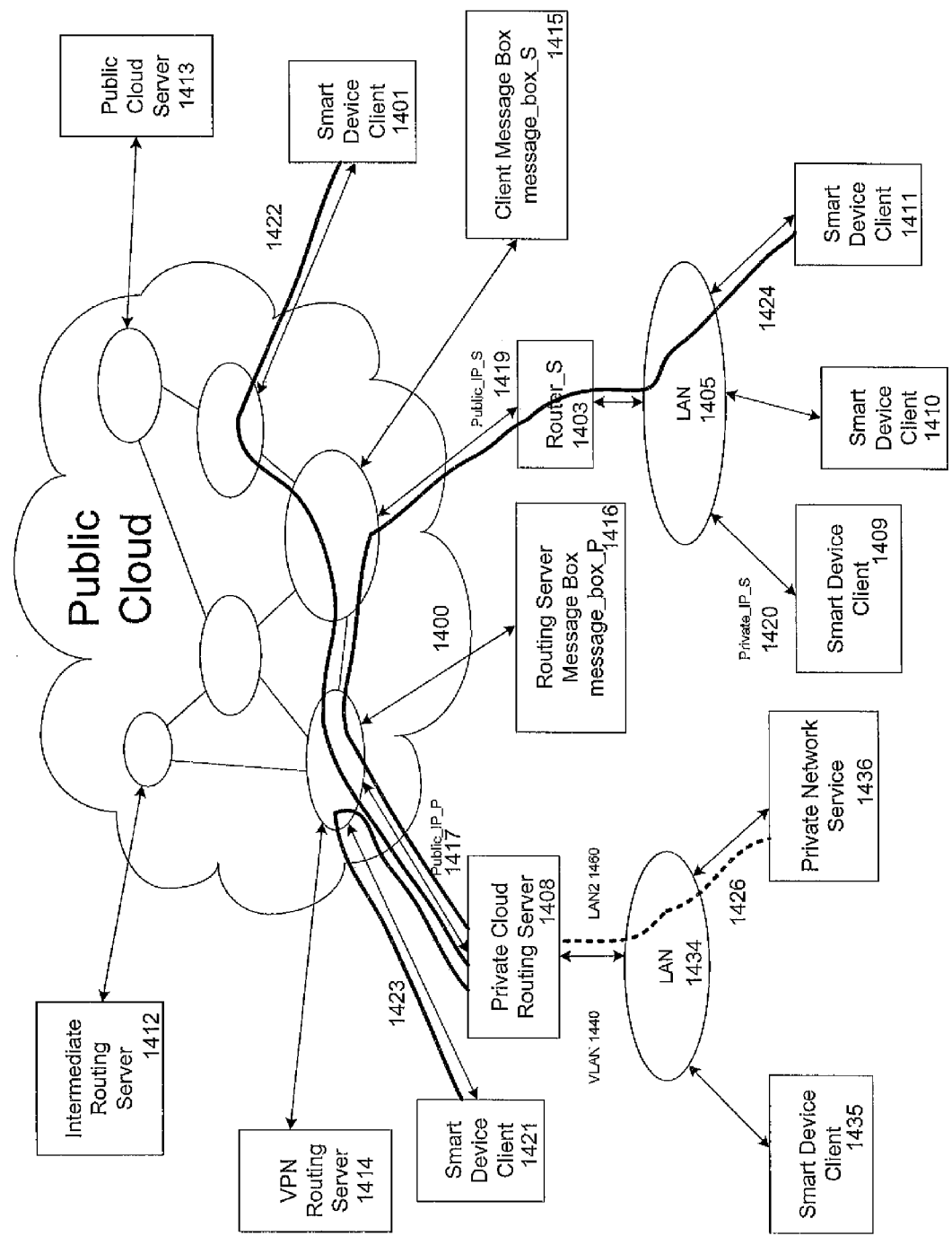
FIG. 14 is a block diagram of a third embodiment of a Cloud Network Infrastructure for the private and secure communication in accordance with the present invention

FIG. 14 shows a block diagram of a third embodiment of the invention. The Private Cloud Routing Server 1408 connects to the cloud and has a public_IP_P 1417. The PCRS 1408 also has a physical LAN LAN2 1460 connecting downstream. A Private Network Service 1436, and a Smart Device Client 1435 are connected downstream. The Private Network Service 1436 is accessible through the communication path 1426, connecting through LAN 1434 to Private Cloud Routing Server 1408. As long as the virtual LAN 1440, the physical LAN LAN2 1460 are all explorable and accessible by the Smart Device Clients 1411, 1410, 1409, 1401, 1421, and 1435 across the cloud through the Private Cloud Routing Server 1408, all Private Network Service 1436, and Smart Device Client 1435 become accessible.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for setting up communications between a first smart device client and a second smart device client by a private cloud routing server (PCRS), comprising:
utilizing, by the PCRS located on a public cloud network, an authentication process to setup a relationship between the PCRS and the first and second smart device client, respectively, wherein the authentication process comprises:
sending, by the PCRS, a first session based message from a message box of the PCRS to a message box of a first smart device client located on the public cloud network, wherein the first session based message includes an address of the message box of the PCRS,
receiving, by the PCRS from the first smart device client, a first session based access request in the message box of the PCRS, wherein the first session based access request includes an address of the message box of the first smart device client, a public IP address of the first smart device client, and a private IP address of the first smart device client,
determining, by the PCRS, that the first session based access request is valid and registering the address of the message box of the first smart device client and both the public and the private IP address of the first smart device client, and transmitting, by the PCRS, a session based acknowledgment to the message box of the first smart device client, wherein the session based acknowledgment includes both a current public and a current private IP address of the PCRS;
in response to a determination by the first smart device client that the session based acknowledgment is valid, binding a public IP address and a private IP address of the PCRS with a registered private IP address of the first smart device client,
wherein the first smart device client connects with the PCRS by at least one connection of:
in response to the private IP address of the PCRS being in a same first Local Area Network (LAN) as the first smart device client, the first smart device client directly connects to the PCRS using the private IP address of the PCRS, and
in response to the private IP address of the PCRS not being in the same first LAN as the first smart device client, the first smart device client connects through a first WAN to the public cloud network using the public IP address of the PCRS,
wherein the first smart device client and the PCRS communicate with each other after the first session based message is authenticated, and
wherein a private network service is then accessible by the first smart device client through the public cloud network based upon the authenticated first session based message;
sending, by the PCRS, a second session based message from the message box of the PCRS to a message box of the second smart client located on the public cloud network, wherein the second session based message includes the address of the message box of the PCRS;
receiving, by the PCRS from the second smart device client, a second session based access request in the message box of the PCRS, wherein the second session based access request includes an address of the message box of the second smart device client, a public IP address of the second smart device client, and a private IP address of the second smart device client;
determining, by the PCRS, that the second session based access request is valid and registering the address of the message box of the second smart device client and both the public and the private IP address of the second smart device client;
transmitting, by the PCRS, a session based acknowledgment to the message box of the second smart device client, wherein the session based acknowledgment includes both a current public and a current private IP address of the PCRS; and
in response to a determination by the second smart device client that the second session based acknowledgment is valid, binding the public IP address and the private IP address of the PCRS with a registered private IP address of the second smart device client,
wherein the second smart device client connects with the PCRS by at least one connection of:
in response to the private IP address of the PCRS being in a same second LAN as the second smart device client, the second smart device client directly connects to the PCRS using the private IP address of the PCRS, and
in response to the private IP address of the PCRS not being in the same second LAN as the second smart device client, the second smart device client connects through the first WAN to the public cloud network using the public IP address of the PCRS,
wherein the first smart device client and the second smart device client communicate with the PCRS after the first and second session based messages are authenticated, and
wherein the first smart device client and the second smart device client communicate with each other through the public cloud network.

2. The method of claim 1, wherein the PCRS comprises:
a computing device;
a connection through a router to a network;
a non-volatile storage storing a program that, in response to execution, causes the PCRS to:
create and manage an authorized client list to accommodate a plurality of smart device clients.

3. The method of claim 2, wherein the program, in response to further execution, causes the PCRS to:
punch a hole in the router to stay open pending a smart device client response; and
wait for the router to bind the network connection between the first smart device client and the PCRS.

4. The method of claim 2, wherein the first smart device client comprises:
a computing device; and
a connection through a router to a network;
wherein the router includes a non-volatile storage storing a program that, in response to execution, causes the first smart device client to:
retrieve a session based invitation from the message box of the first smart device client,
send a session based access request to the message box of the PCRS,
retrieve a session based acknowledgement from the message box of the first smart device client,
send a communication request to the PCRS,
punch a hole in the router to stay open pending the PCRS response,
wait for the router to bind the network connection between the PCRS and the first smart device client,
route incoming request from the PCRS to the first smart device client,
establish a peer-to-peer communication with the PCRS,
access the at least one private network service through the PCRS, and
communicate with the second smart device client through the PCRS.

5. The method of claim 4, wherein the program, in response to further execution, causes the first smart device client to:
access the PCRS behind a firewall with fixed or dynamic IP addresses, wherein the first smart device client requires no outside or public cloud based routing server in a wide area network (WAN) and requires no additional router setup in a local area network (LAN);
establish a peer-to-peer communication channel with the PCRS;
access a private network service through the PCRS; and
communicate with the second smart device client through the PCRS.

6. The method of claim 4, wherein the program, in response to further execution, causes the first smart device client to:
access the PCRS behind a firewall with fixed or dynamic IP addresses, wherein the first smart device client requires no outside or public cloud based routing server in a wide area network (WAN) and requires no additional router setup in the a local area network (LAN);
establish a peer-to-peer communication channel with the PCRS;
mapping local physical I/O to a virtual PCRS I/O;
accessing private network service through the PCRS; and
communicating with the second smart device client through the PCRS.

7. The method of claim 2, wherein the first smart device client comprises:
a computing device;
a connection to a network; and
a non-volatile storage storing a program that, in response to execution, causes the first smart device client to:
retrieve a session based invitation from the message box of the first smart device client,
send a session based reply to the message box of the PCRS,
retrieve a session based acknowledgement from the message box of the first smart device client,
send an access request to the PCRS,
wait for the PCRS response,
bind the network connection between the PCRS and the first smart device client,
route incoming request from the PCRS to first smart device client,
establish a peer-to-peer communication with the PCRS,
access the at least one private network service through the PCRS; and
communicate with the first smart device client through the PCRS.

8. The method of claim 7, wherein the program, in response to further execution, causes the first smart device client to:
access the PCRS behind a firewall with fixed or dynamic IP addresses, wherein the first smart device client requires no outside or public cloud based routing server in the a wide area network (WAN) and requires no additional router setup in a local area network (LAN);
establish a peer-to-peer communication with the PCRS;
access a private network service through the PCRS; and
communicate with the second smart device client through the PCRS.

9. The method of claim 7, wherein the program, in response to further execution, causes the first smart device client to:
access the PCRS behind a firewall with fixed or dynamic IP addresses, wherein the first smart device client requires no outside or public cloud based routing server in a wide area network (WAN) and requires no additional router setup in a local area network (LAN);
establish a peer-to-peer communication with the PCRS;
map local physical I/O to virtual server I/O;
access private network service through the PCRS; and
communicate with the second smart device client through the PCRS.

10. A private cloud routing server (PCRS), comprising:
a computing device;
a connection through a router to a network; and
a non-volatile storage storing a program that, in response to execution by the computing device, causes the PCRS to:
utilize an authentication process to setup a relationship between the PCRS and a first and second smart device client, respectively, wherein the authentication process comprises:
sending, by the PCRS, a first session based message from a message box of the PCRS to a message box of a first smart device client located on the public cloud network, wherein the first session based message includes an address of the message box of the PCRS,
receiving, by the PCRS from the first smart device client, a first session based access request in the message box of the PCRS, wherein the first session based access request includes an address of the message box of the first smart device client, a public IP address of the first smart device client, and a private IP address of the first smart device client,
determining, by the PCRS, that the first session based access request is valid and registering the address of the message box of the first smart device client and both the public and the private IP address of the first smart device client, and transmitting, by the PCRS, a session based acknowledgment to the message box of the first smart device client, wherein the session based acknowledgment includes both a current public and a current private IP address of the PCRS;

wherein in response to a determination by the first smart device client that the session based acknowledgment is valid, binding a public IP address and a private IP address of the PCRS with a registered private IP address of the first smart device client, wherein the first smart device client connects with the PCRS by at least one connection of:
  in response to the private IP address of the PCRS being in a same first Local Area Network (LAN) as the first smart device client, the first smart device client directly connects to the PCRS using the private IP address of the PCRS, and
  in response to the private IP address of the PCRS not being in the same first LAN as the first smart device client, the first smart device client connects through a first WAN to the public cloud network using the public IP address of the PCRS, wherein the first smart device client and the PCRS communicate with each other after the first session based message is authenticated, and wherein a private network service is then accessible by the first smart device client through the public cloud network based upon the authenticated first session based message;

send a second session based message from the message box of the PCRS to a message box of the second smart client located on the public cloud network, wherein the second session based message includes the address of the message box of the PCRS; and receive from the second smart device client, a second session based access request in the message box of the PCRS, wherein the second session based access request includes an address of the message box of the second smart device client, a public IP address of the second smart device client, and a private IP address of the second smart device client;

determine, by the PCRS, that the second session based access request is valid and registering the address of the message box of the second smart device client and both the public and the private IP address of the second smart device client; and transmit, by the PCRS, a session based acknowledgment to the message box of the second smart device client, wherein the session based acknowledgment includes both a current public and a current private IP address of the PCRS;

wherein in response to a determination by the second smart device client that the second session based acknowledgment is valid, binding the public IP address and the private IP address of the PCRS with a registered private IP address of the second smart device client, wherein the second smart device client connects with the PCRS by at least one connection of:
  in response to the private IP address of the PCRS being in a same second LAN as the second smart device client, the second smart device client directly connects to the PCRS using the private IP address of the PCRS, and
  in response to the private IP address of the PCRS not being in the same second LAN as the second smart device client, the second smart device client connects through the first WAN to the public cloud network using the public IP address of the PCRS, wherein the first smart device client and the second smart device client communicate with the PCRS after the first and second session based messages are authenticated, and wherein the first smart device client and the second smart device client communicate with each other through the public cloud network.

11. The PCRS of claim 10, wherein the program in response to further execution, causes the private cloud server to:
  punch a hole in the router to stay open pending a smart device client response; and
  wait for the router to bind the network connection between the smart device client and the PCRS wherein the router routes an incoming request from the smart device client to the PCRS.

12. A smart device client, comprising:
  a computing device;
  a connection through a router to a network; and
  a non-volatile storage of the router storing a program that, in response to execution, causes the smart device client to:
    retrieve a session based invitation from a smart device client message box,
    send a session based access request to a private cloud routing server message box of a private cloud routing server (PCRS),
      wherein the PCRS receives from the smart device client, the session based access request in the private cloud routing server message box of the PCRS, wherein the session based access request includes an address of the smart device client message box, a public IP address of the smart device client, and a private IP address of the smart device client, and
      wherein the PCRS determines that the session based access request is valid and registers the address of the smart device client message box and both the public and the private IP address of the smart device client,
    retrieve a session based acknowledgement from the smart device client message box,
      wherein the session based acknowledgment includes both a current public and a current private IP address of the PCRS,
    send a communication request to the PCRS,
    punch a hole in the router to stay open pending a PCRS response;
    determine that the session based acknowledgment is valid,
    in response to receiving a valid session based acknowledgement, binding, by the smart device client, a public IP address and a private IP address of the PCRS with the registered private IP address of the smart device client via an authentication process,
    route an incoming request from the PCRS to the smart device client, connect with the PCRS by at least one connection of:
  in response to the private IP address of the PCRS being in a same first Local Area Network (LAN) as the smart device client, the smart device client directly connects to the PCRS using the private IP address of the PCRS, and
  in response to the private IP address of the PCRS not being in the same first LAN as the smart device client, the smart device client connects through a first WAN to the public cloud network using the public IP address of the PCRS,
establish a peer-to-peer communication with the PCRS,
access private network service through the PCRS, and
communicate with at least another smart device client through the PCRS.

13. The smart device client of claim 12, wherein the program, in response to further execution, causes the smart device client to:
access the PCRS behind a firewall with fixed or dynamic IP addresses, wherein the smart device client requires no outside or public cloud based routing server in a wide area network (WAN) and requires no additional router setup in a local area network (LAN); and
access a private network service through the PCRS.

14. The smart device client of claim 12, wherein the program, in response to further execution, causes the smart device client to:
access the PCRS behind a firewall with fixed or dynamic IP addresses, wherein the smart device client requires no outside or public cloud based routing server in a wide area network (WAN) and requires no additional router setup in a local area network (LAN);
map a local physical I/O to a virtual server I/O; and
access a private network service through the PCRS.

15. A smart device client, comprising:
a computing device;
a connection to a network; and
a non-volatile storage storing a program that, in response to execution, causes the smart device client to:
  retrieve a session based invitation from a smart device client message box,
  send a session based reply to a private cloud routing server message box of a private cloud routing server (PCRS),
    wherein the PCRS receives from the smart device client, the session based reply in the private cloud routing server message box of the PCRS,
    wherein the session based reply includes an address of the smart device client message box, a public IP address of the smart device client, and a private IP address of the smart device client, and
    wherein the PCRS determines that the session based reply is valid and registers the address of the smart device client message box and both a public and a private IP address of the smart device client,
  retrieve a session based acknowledgement from the smart device client message box,
    wherein the session based acknowledgment includes both a current public and a current private IP address of the PCRS,
  send an access request to the PCRS,
  wait for the PCRS response,
  determine that the session based acknowledgment is valid,
  in response to receiving a valid session based acknowledgement, binding, by a router of the smart device client, a public IP address and a private IP address of the private cloud server with the registered private IP address of the smart device client via an authentication process,
  routes incoming request from the PCRS to the smart device client,
  connect with the PCRS by at least one connection of:
    in response to the private IP address of the PCRS being in a same first Local Area Network (LAN) as the smart device client, the smart device client directly connects to the PCRS using the private IP address of the PCRS, and
    in response to the private IP address of the PCRS not being in the same first LAN as the smart device client, the smart device client connects through a first WAN to the public cloud network using the public IP address of the PCRS,
  establish a peer-to-peer communication with the PCRS,
  access private network service through the PCRS, and
  communicate with at least another smart device client through the PCRS.

16. The smart device client of claim 15, wherein the program, in response to further execution, causes the smart device client to:
access the PCRS behind a firewall with fixed or dynamic IP addresses, wherein the smart device client requires no outside or public cloud based routing server in a wide area network (WAN) and requires no additional router setup in a local area network (LAN); and
access private network service through the PCRS.

17. The smart device client of claim 15, wherein the program, in response to further execution, causes the smart device client to:
access the PCRS behind a firewall with fixed or dynamic IP addresses, wherein the smart device client requires no outside or public cloud based routing server in a wide area network (WAN) and requires no additional router setup in a local area network (LAN);
map a local physical I/O to a virtual PCRS I/O; and
access a private network service through the PCRS.

18. A smart device client, comprising:
a computing device;
a connection to a network; and
a non-volatile storage storing a program that, in response to execution, locates a private cloud routing server (PCRS) and causes the smart device client to:
  retrieve a session based invitation from the smart device client message box,
  send a session based reply to a PCRS message box,
    wherein the PCRS receives from the smart device client, the session based reply in the private cloud routing server message box of the PCRS,
    wherein the session based reply includes an address of the smart device client message box, a public IP address of the smart device client, and a private IP address of the smart device client, and
    wherein the PCRS determines that the session based reply is valid and registers the address of the smart device client message box and both the public and the private IP address of the smart device client,
  retrieve a session based acknowledgement from the smart device client message box,
    wherein the session based acknowledgment includes both a current public and a current private IP address of the PCRS,
  send an access request to the PCRS,
  wait for the PCRS response, determine that the session based acknowledgment is valid, in response to receiving a valid session based acknowledgement, binding, by a router of the smart device client, a public IP address and a private IP address of the PCRS with the registered private IP address of the smart device client via an authentication process, routes incoming request from the PCRS to the smart device client, connect with the PCRS by at least one connection of:
in response to the private IP address of the PCRS being in a same first Local Area Network (LAN) as the smart device client, the smart device client directly connects to the PCRS using the private IP address of the PCRS, and in response to the private IP address of the PCRS not being in the same first LAN as the smart device client, the smart device client connects through a first WAN to the public cloud network using the public IP address of the PCRS, establish a peer-to-peer communication with the PCRS, join a virtual local area network (VLAN) under the PCRS, access private network service through the at least one PCRS, start a communication session as a host, create and host a communication session, invite a communication guest, scan for a recognizable guest, start communication with a guest, receive a communication invitation and joins the communication session as a guest, scan for a recognizable host, log-in communication authentication, join a communication session, and start communication with the host.

19. The smart device client of claim 18, wherein the program, in response to further execution, causes the smart device to:

access the PCRS behind a firewall with fixed or dynamic IP addresses, wherein the smart device client requires no outside or public cloud based routing server in a WAN and requires no additional router setup in a LAN; and access private network service through the PCRS.

20. The smart device client of claim 18, wherein the program, in response to further execution, causes the smart device to:

access the PCRS behind a firewall with fixed or dynamic IP addresses, wherein the smart device client requires no outside or public cloud based routing server in a wide area network (WAN) and requires no additional router setup in a local area network (LAN); and conduct communication with at least another smart device client through the PCRS.

21. The smart device client of claim 18, wherein communication comprises at least one of:

video, audio, text, or application, wherein the application includes at least one of a program, utility, operation, or remote desktop that is recognizable by both the host and guest.

* * * * *